United States Patent
Papasakellariou et al.

(10) Patent No.: US 12,250,176 B2
(45) Date of Patent: Mar. 11, 2025

(54) UE OPERATION WITH REDUCED POWER CONSUMPTION

(71) Applicant: Samsung Electronics Co., Ltd., Suwon-si (KR)

(72) Inventors: Aris Papasakellariou, Houston, TX (US); Qiongjie Lin, Mountain View, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 221 days.

(21) Appl. No.: 18/161,822

(22) Filed: Jan. 30, 2023

(65) Prior Publication Data
US 2023/0179387 A1   Jun. 8, 2023

Related U.S. Application Data

(63) Continuation of application No. 17/248,957, filed on Feb. 15, 2021, now Pat. No. 11,588,606, which is a
(Continued)

(51) Int. Cl.
*H04L 5/00* (2006.01)
*H04W 72/0446* (2023.01)
*H04W 84/20* (2009.01)

(52) U.S. Cl.
CPC .......... *H04L 5/0094* (2013.01); *H04L 5/0092* (2013.01); *H04L 5/0098* (2013.01); *H04W 72/0446* (2013.01); *H04W 84/20* (2013.01)

(58) Field of Classification Search
CPC .............. H04W 84/20; H04W 72/0446; H04L 5/0098; H04L 5/0092; H04L 5/0094
(Continued)

(56) References Cited

U.S. PATENT DOCUMENTS

| 2015/0208366 A1 | 7/2015 | Papasakellariou et al. |
| 2016/0128034 A1 | 5/2016 | Choi et al. |

(Continued)

FOREIGN PATENT DOCUMENTS

| CN | 107027344 A | 8/2017 |
| KR | 20170095920 A | 8/2017 |

(Continued)

OTHER PUBLICATIONS

Japanese Patent Office, Notice of Reasons for Rejection issued Jun. 26, 2023 regarding Application No. 2021-514427, 5 pages.
(Continued)

*Primary Examiner* — Peter G Solinsky

(57) ABSTRACT

Methods, user equipment (UE), and base stations for reception or transmission of physical downlink control channels (PDCCH) associated with a master node (MN) or with a secondary node (SN) are provided. A method of operating a UE to receive PDCCHs includes receiving an indication for a first number of cells $N_{cells,MCG}^{cap}$ and for a second number of cells $N_{cells,SCG}^{cap}$; and determining a first total number of PDCCH candidates on $N_{cells,MCG}^{DL,\mu}$ cells of the MN over a time period according to $N_{cells,MCG}^{cap}$ and a second total number of PDCCH candidates on $N_{cells,SCG}^{DL,\mu}$ cells of the SN over the time period according to $N_{cells,SCG}^{cap}$. $\mu$ is a subcarrier spacing (SCS) configuration for an active bandwidth part (BWP) on each of the $N_{cells,MCG}^{DL,\mu}$ cells or $N_{cells,SCG}^{DL,\mu}$ cells.

20 Claims, 11 Drawing Sheets

Related U.S. Application Data continuation of application No. 16/539,869, filed on Aug. 13, 2019, now Pat. No. 10,924,250.

(60) Provisional application No. 62/841,868, filed on May 2, 2019, provisional application No. 62/791,260, filed on Jan. 11, 2019, provisional application No. 62/752,528, filed on Oct. 30, 2018, provisional application No. 62/738,076, filed on Sep. 28, 2018, provisional application No. 62/730,728, filed on Sep. 13, 2018.

(58) Field of Classification Search
USPC .......................................................... 370/329
See application file for complete search history.

(56) References Cited

U.S. PATENT DOCUMENTS

| | | | |
|---|---|---|---|
| 2017/0367046 | A1 | 12/2017 | Papasakellariou |
| 2017/0374569 | A1 | 12/2017 | Lee |
| 2020/0274679 | A1 | 8/2020 | Futaki |
| 2020/0305134 | A1 | 9/2020 | Noh |
| 2021/0185614 | A1* | 6/2021 | Zhou ................. H04W 52/0225 |

FOREIGN PATENT DOCUMENTS

| | | | |
|---|---|---|---|
| WO | 2015108388 | A1 | 7/2015 |
| WO | 2016114560 | A1 | 7/2016 |
| WO | 2016164775 | A1 | 10/2016 |

OTHER PUBLICATIONS

Samsung, "Remaining Issues on PDCCH and Search Space Design", 3GPP TSG RAN WG1 Meeting #94bis, R1-1810842, Oct. 2018, 7 pages.
"3rd Generation Partnership Project; Technical Specification Group Radio Access Network; NR; Physical layer procedures for control (Release 15)" 3GPP TS 38.213 V15.2.0, Jun. 2018, 99 pages.
"3rd Generation Partnership Project; Technical Specification Group Radio Access Network; NR; Radio Resource Control (RRC) protocol specification (Release 15)", 3GPP TS 38.331 V15.2.1 , Jun. 2018, 303 pages.
"5G; NR; Medium Access Control (MAC) protocol specification (3GPP TS 38.321 version 15.3.0 Release 15)", ETSI TS 138 321 V15.3.0, Sep. 2018, 77 pages.
"5G; NR; Multiplexing and channel coding (3GPP TS 38.212 version 15.3.0 Release 15)", ETSI TS 138 212 V15.3.0, Oct. 2018, 102 pages.
"5G; NR; Physical Channels and modulation (3GPP TS 38.211 version 15.3.0 Release 15)", ETSI TS 138 211 V15.3.0, Oct. 2018, 98 pages.
"5G; NR; Physical layer procedures for control (3GPP TS 38.213 version 15.3.0 Release 15)", ETSI TS 138 213 V15.3.0, Oct. 2018, 102 pages.
"5G; NR; Physical layer procedures for data (3GPP TS 38.214 version 15.3.0 Release 15)", ETSI TS 138 214 V15.3.0, Oct. 2018, 99 pages.
"5G; NR; Radio Resource Control (RRC); Protocol specification (3GPP TS 38.331 version 15.3.0 Release 15)", ETSI TS 138 331 V15.3.0, Oct. 2018, 441 pages.
International Search Report dated Dec. 24, 2019 in connection with International Patent Application No. PCT/KR2019/011938, 3 pages.
Written Opinion of the International Searching Authority dated Dec. 24, 2019 in connection with International Patent Application No. PCT/KR2019/011938, 6 pages.
Extended European Search Report dated Mar. 31, 2022 regarding Application No. 19859895.5, 7 pages.
Intellectual Property India, Examination Report dated Dec. 2, 2022 regarding Application No. 202137009954, 7 pages.
Spreadtrum Communications, "Remaining issues on PDCCH", 3GPP TSG RAN WG1 Meeting #94, Aug. 20-24, 2018, R1-1808796, 11 pages.
Chinese National Intellectual Property Administration, First Office Action issued Dec. 8, 2023 regarding Application No. 201980060396. X, 8 pages.

* cited by examiner

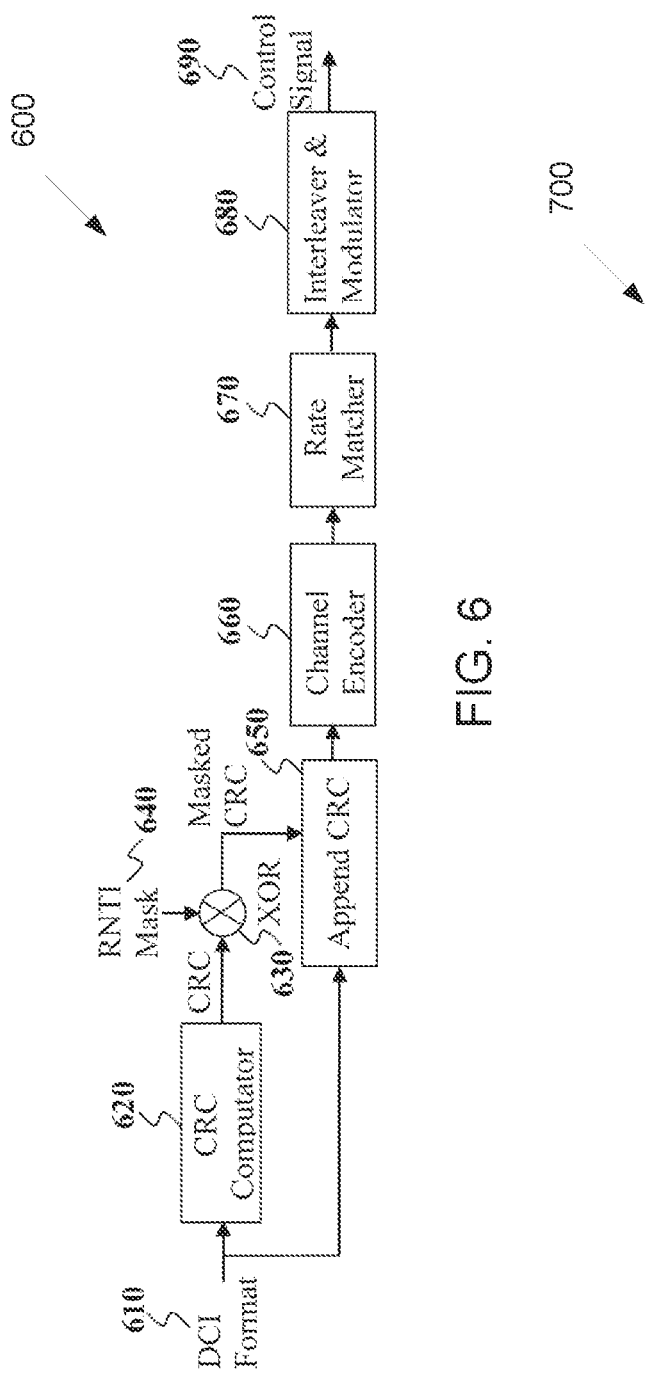
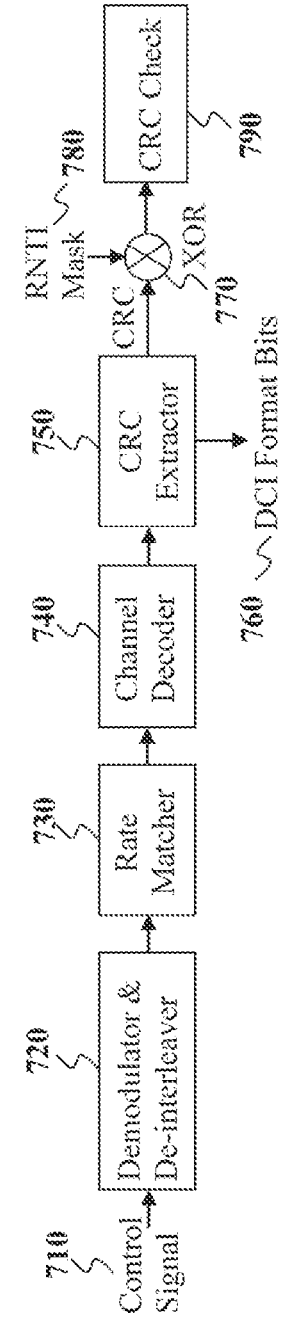
FIG. 6
FIG. 7

UE OPERATION WITH REDUCED POWER CONSUMPTION

CROSS-REFERENCE TO RELATED APPLICATIONS AND CLAIM OF PRIORITY

The present application is a continuation of U.S. Non-Provisional patent application Ser. No. 17/248,957 filed Feb. 15, 2021, which is a continuation of U.S. Non-Provisional patent application Ser. No. 16/539,869 filed Aug. 13, 2019, now U.S. Pat. No. 10,924,250 and claims priority to U.S. Provisional Patent Application Ser. No. 62/730,728, filed on Sep. 13, 2018; U.S. Provisional Patent Application Ser. No. 62/738,076, filed on Sep. 28, 2018; U.S. Provisional Patent Application Ser. No. 62/752,528, filed on Oct. 30, 2018; U.S. Provisional Patent Application Ser. No. 62/791,260, filed on Jan. 11, 2019; and U.S. Provisional Patent Application Ser. No. 62/841,868, filed on May 2, 2019. The content of the above-identified patent documents is incorporated herein by reference.

TECHNICAL FIELD

The present application relates generally to wireless communication systems and, more specifically, the present application relates to operation with reduced power consumption for a user equipment (UE) and to transmissions and receptions of physical downlink control channels (PDCCHs) for operation with dual connectivity.

BACKGROUND

The present disclosure relates to a pre-5$^{th}$-generation (5G) or 5G communication system to be provided for supporting higher data rates beyond 4$^{th}$-generation (4G) communication system such as long-term evolution (LTE). The present disclosure relates to indicating to a UE whether or not to monitor PDCCH candidates for a number of C-DRX periods or for a number of PDCCH monitoring occasions within a C-DRX period. The disclosure also relates to providing means to a UE to indicate to a serving gNB preferred configurations for transmissions and receptions. The present disclosure further relates to enabling a UE to perform fast activation and deactivation for a number of secondary cells (SCells). The present disclosure additionally relates to designing new operating modes for communication between a UE and a serving gNB that enable UE power savings without penalizing network operation. The present disclosure also relates to adapting a set of slot timing values K1 for a HARQ-ACK codebook determination with respect to a number of active SCells and a corresponding subcarrier spacing (SCS) configuration. The present disclosure further relates to setting a processing time for scheduling PDSCH/PUSCH and to combining an activation/deactivation of SCells together with dynamic adaptation on processing time for scheduling. The present disclosure additionally relates to establishing a same understanding among an master node (MN), an secondary node (SN), and a UE for a number of PDCCH candidates that the UE is expected to monitor per slot and for a number of non-overlapping CCEs that the UE is expected to able to perform channel estimation per slot.

SUMMARY

The present disclosure relates to a pre-5G or 5G communication system to be provided for supporting reduced UE power consumption and operation with dual connectivity beyond a 4G communication system such as LTE. Embodiments of the present disclosure provide transmission structures and format in advanced communication systems.

In one embodiment, a method for a UE to receive PDCCHs from a MN or from a SNs provided. The method includes receiving an indication for a first number of cells $N_{cells,MCG}^{cap}$ and for a second number of cells $N_{cells,SCG}^{cap}$; and determining a first total number of PDCCH candidates for $N_{cells,MCG}^{DL,\mu}$ downlink (DL) cells of the MN over a time period according to $N_{cells,MCG}^{cap}$ and a second total number of PDCCH candidates for $N_{cells,SCG}^{DL,\mu}$ DL cells of the SN over the time period according to $N_{cells,SCG}^{cap}$. MCG denotes a master cell group for the MN, SCG denotes a secondary cell group for the SN. μ is a subcarrier spacing (SCS) configuration for an active bandwidth part (BWP) for each of the $N_{cells,MCG}^{DL,\mu}$ DL cells or $N_{cells,SCG}^{DL,\mu}$ DL cells.

In another embodiment, a base station is provided. The base station includes a transmitter and a processor operably connected to the transmitter. The transmitter is configured to transmit an indication for a first number of cells $N_{cells,MCG}^{cap}$ and for a second number of cells $N_{cells,SCG}^{cap}$. The processor is configured to determine a number of PDCCH candidates $M_{PDCCH,MCG}^{total,\mu}$ for $N_{cells,MCG}^{DL,\mu}$ cells over a time period according to $N_{cells,MCG}^{cap}$. μ is a SCS configuration for an active BWP for each of the $N_{cells,MCG}^{DL,\mu}$ DL cells.

In yet another embodiment, a UE is provided. The UE includes a receiver and a processor operably connected to the receiver. The receiver is configured to receive an indication for a first number of cells $N_{cells,MCG}^{cap}$ and for a second number of cells $N_{cells,SCG}^{cap}$ The processor is configured to determine a first total number of PDCCH candidates $M_{PDCCH,MCG}^{total,\mu}$ for $N_{cells,MCG}^{DL,\mu}$ DL cells over a time period according to $N_{cells,MCG}^{cap}$ and a second total number of PDCCH candidates $M_{PDCCH,SCG}^{total,\mu}$ for $N_{cells,SCG}^{DL,\mu}$ DL cells over the time period according to $N_{cells,SCG}^{DL,\mu}$. MCG denotes a master cell group for a MN and SCG denotes a secondary cell group for a SN. μ is a SCS configuration for an BWP for each of the $N_{cells,MCG}^{DL,\mu}$ DL cells or $N_{cells,SCG}^{DL,\mu}$ DL cells.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 illustrates an example encoding process for a DCI format according to embodiments of the present disclosure;

FIG. 7 illustrates an example decoding process for a DCI format for use with a UE according to embodiments of the present disclosure;

DETAILED DESCRIPTION

FIG. 1 through FIG. 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v15.3.0, "NR; Physical channels and modulation;" 3GPP TS 38.212 v15.3.0, "NR; Multiplexing and Channel coding;" 3GPP TS 38.213 v15.3.0, "NR; Physical Layer Procedures for Control;" 3GPP TS 38.214 v15.3.0, "NR; Physical Layer Procedures for Data;" 3GPP TS 38.321 v15.3.0, "NR; Medium Access Control (MAC) protocol specification;" and 3GPP TS 38.331 v15.3.0, "NR; Radio Resource Control (RRC) Protocol Specification."

Figure 1:
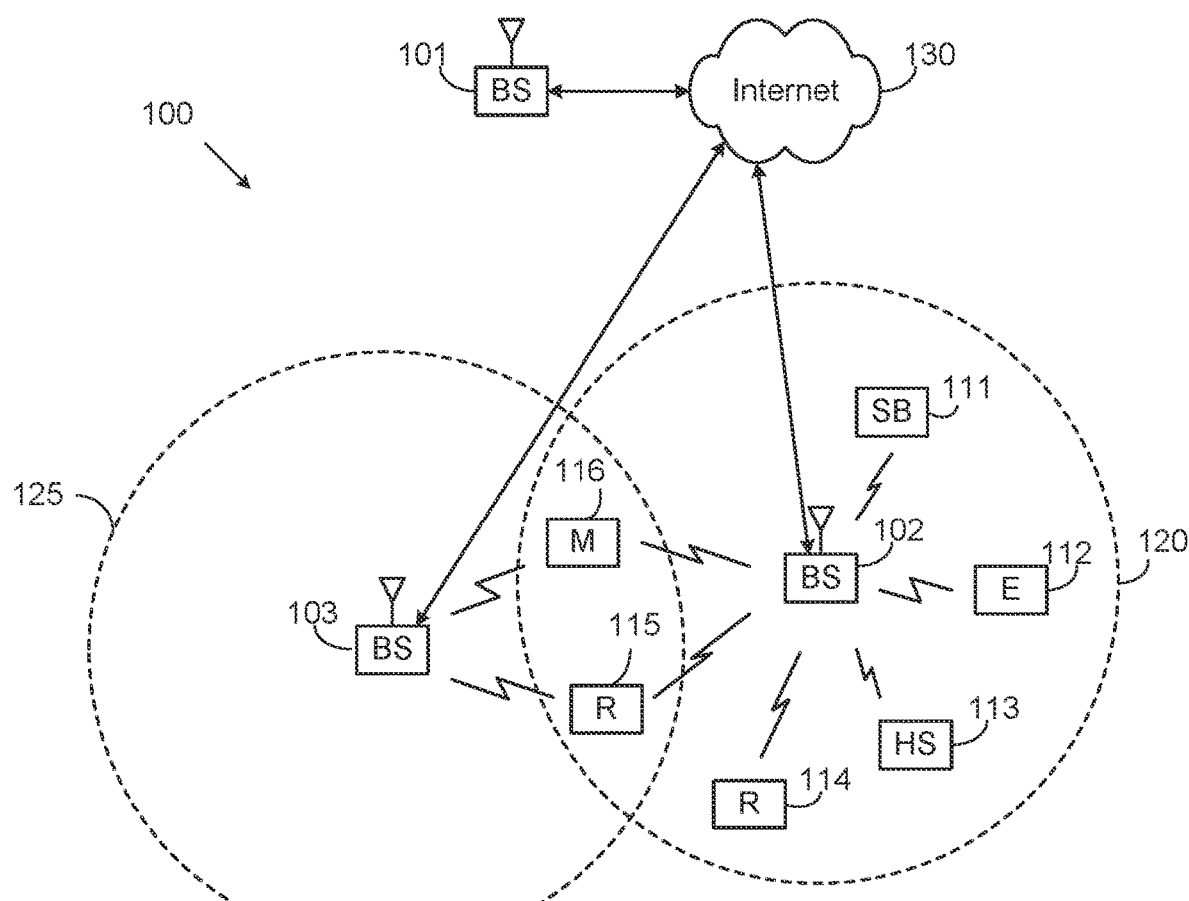
FIG. 1 illustrates an example wireless network according to embodiments of the present disclosure.
Figure 2:
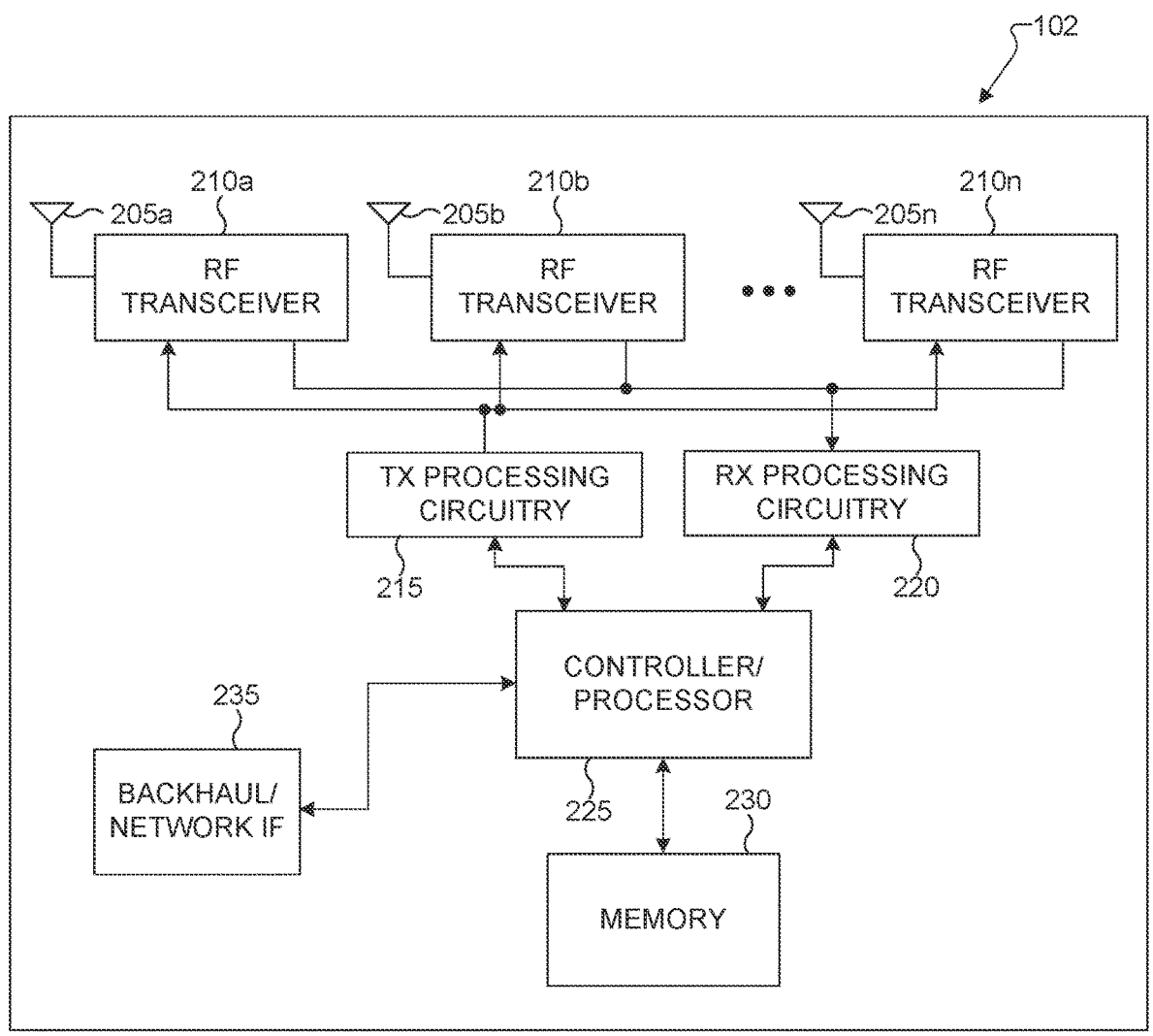
FIG. 2 illustrates an example gNB according to embodiments of the present disclosure.
Figure 3:
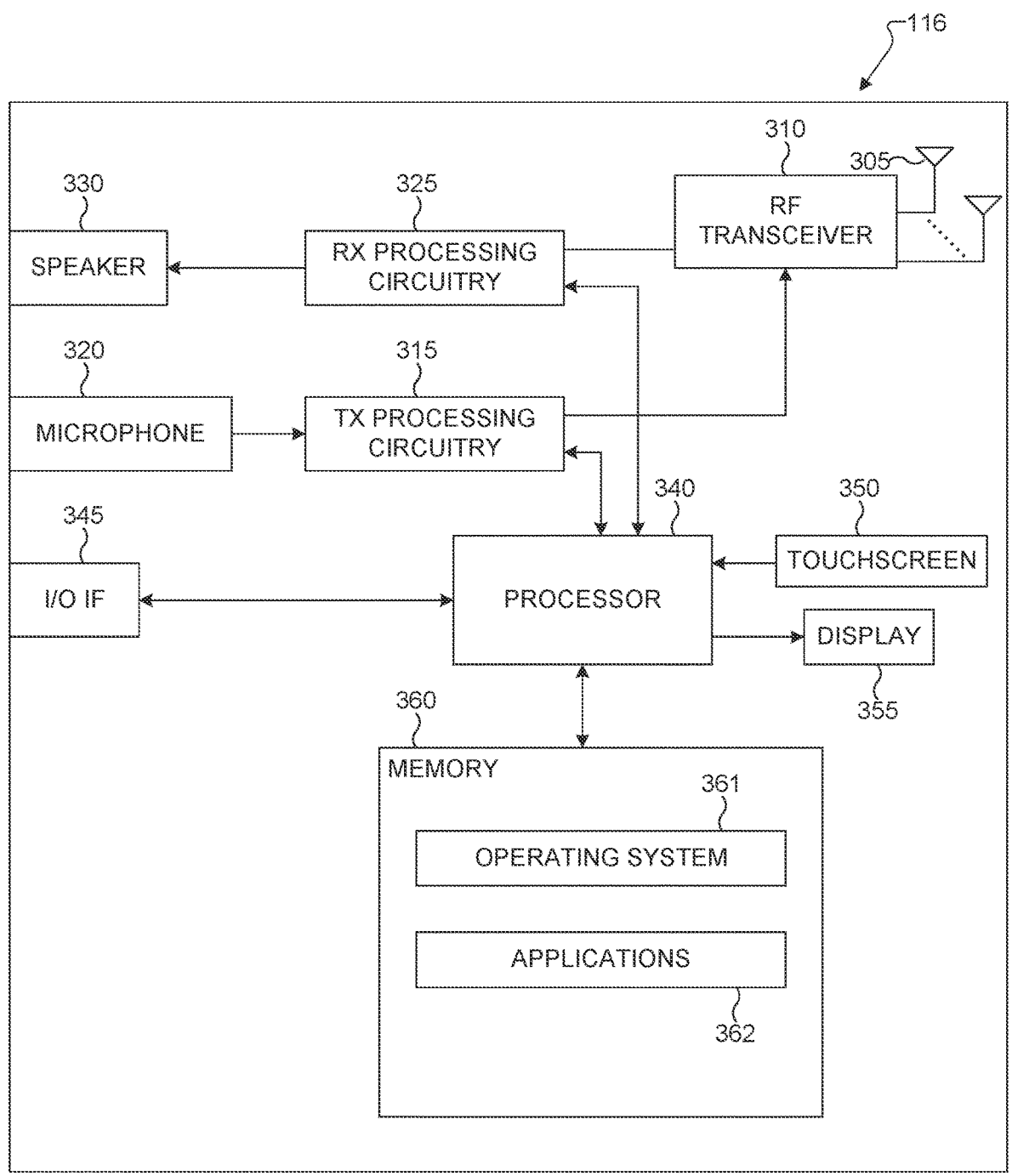
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNB s 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for reception reliability for data and control information in an advanced wireless communication system. In certain embodiments, and one or more of the gNBs 101-103 includes circuitry, programing, or a combination thereof, for efficient reduced power consumption in an advanced wireless communication system.

Although FIG. 1 illustrates one example of a wireless network, various changes may be made to FIG. 1. For example, the wireless network could include any number of gNBs and any number of UEs in any suitable arrangement.

Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

A communication system includes a downlink (DL) that refers to transmissions from a base station or one or more transmission points to UEs and an uplink (UL) that refers to transmissions from UEs to a base station or to one or more reception points.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system." The 5G communication system is considered to be implemented in higher frequency (mmWave) bands, e.g., 60 GHz bands, so as to accomplish higher data rates. To decrease propagation loss of the radio waves and increase the transmission distance, the beam-forming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can include 14 symbols, have duration of 1 millisecond or 0.5 milliseconds, and an RB can have a BW of 180 kHz or 360 kHz and include 12 SCs with inter-SC spacing of 15 kHz or 30 kHz, respectively.

DL signals include data signals conveying information content, control signals conveying DL control information (DCI) formats, and reference signals (RS). A gNB can transmit data information (e.g., transport blocks) or DCI formats through respective physical DL shared channels (PDSCHs) or physical DL control channels (PDCCHs). A gNB can transmit one or more of multiple types of RS including channel state information RS (CSI-RS) and demodulation RS (DMRS). A CSI-RS is intended for UEs to measure channel state information (CSI) or to perform other measurements such as ones related to mobility support. A DMRS can be transmitted only in a BW of a respective PDCCH or PDSCH and a UE can use the DMRS to demodulate data or control information.

UL signals also include data signals conveying information content, control signals conveying UL control information (UCI), and RS. A UE transmits data information (e.g., transport blocks) or UCI through a respective physical UL shared channel (PUSCH) or a physical UL control channel (PUCCH). When a UE would simultaneously transmit data information and UCI, the UE can multiplex both in a PUSCH transmission or multiplex them separately in respective PUSCH and PUCCH transmissions. UCI includes hybrid automatic repeat request acknowledgement (HARQ-ACK) information, indicating correct or incorrect detection of data transport blocks (TB s) by a UE, scheduling request (SR) indicating whether a UE has data in the UE's buffer, and CSI reports enabling a gNB to select appropriate parameters to perform link adaptation for PDSCH or PDCCH transmissions to a UE.

A CSI report from a UE can include a channel quality indicator (CQI) informing a gNB of a modulation and coding scheme (MCS) for the UE to detect a data TB with a predetermined block error rate (BLER), such as a 10% BLER, of a precoding matrix indicator (PMI) informing a gNB how to precode signaling to a UE, of a rank indicator (RI) indicating a transmission rank for a PDSCH, of a CSI-RS resource indicator (CRI), and so on. UL RS includes DMRS and sounding RS (SRS). DMRS is transmitted only in a BW of a respective PUSCH or PUCCH transmission. A gNB can use a DMRS to demodulate information symbols in a respective PUSCH or PUCCH. SRS is transmitted by a UE to provide a gNB with UL CSI and, for a TDD or a flexible duplex system, to also provide a PMI for DL transmissions. An UL DMRS or SRS transmission can be based, for example, on a transmission of a Zadoff-Chu (ZC) sequence or, in general, of a CAZAC sequence.

DL transmissions and UL transmissions can be based on an orthogonal frequency division multiplexing (OFDM) waveform including a variant using DFT precoding that is known as DFT-spread-OFDM.

Figure 4:
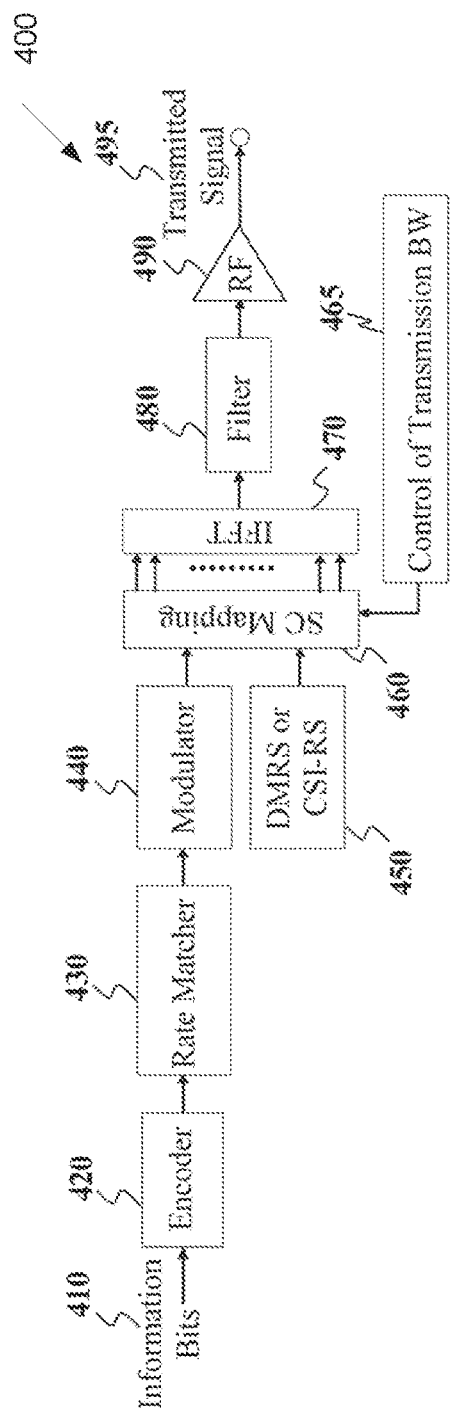
FIG. 4 illustrates an example transmitter structure using OFDM according to embodiments of the present disclosure.

FIG. 4 illustrates an example transmitter structure 400 using OFDM according to embodiments of the present disclosure. An embodiment of the transmitter structure 400 shown in FIG. 4 is for illustration only. One or more of the components illustrated in FIG. 4 can be implemented in specialized circuitry configured to perform the noted functions or one or more of the components can be implemented by one or more processors executing instructions to perform the noted functions. Other embodiments are used without departing from the scope of the present disclosure.

Information bits, such as DCI bits or data bits 410, are encoded by encoder 420, rate matched to assigned time/frequency resources by rate matcher 430 and modulated by modulator 440. Subsequently, modulated encoded symbols and DMRS or CSI-RS 450 are mapped to SCs 460 by SC mapping unit 465, an inverse fast Fourier transform (IFFT) is performed by filter 470, a cyclic prefix (CP) is added by CP insertion unit 480, and a resulting signal is filtered by filter 490 and transmitted by an radio frequency (RF) unit 495.

Figure 5:
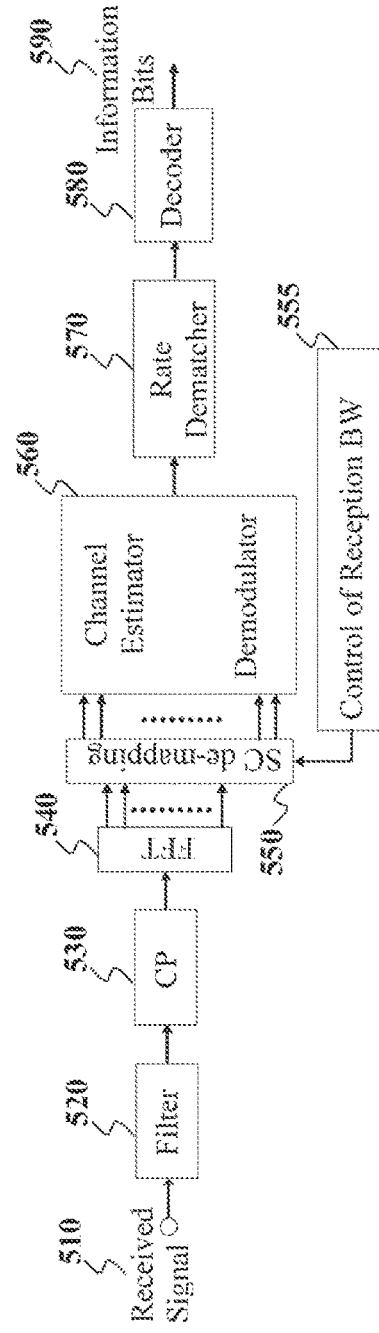
FIG. 5 illustrates an example receiver structure using OFDM according to embodiments of the present disclosure.

FIG. 5 illustrates an example receiver structure 500 using OFDM according to embodiments of the present disclosure. An embodiment of the receiver structure 500 shown in FIG. 5 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure.

A received signal 510 is filtered by filter 520, a CP removal unit removes a CP 530, a filter 540 applies a fast Fourier transform (FFT), SCs de-mapping unit 550 de-maps SCs selected by BW selector unit 555, received symbols are demodulated by a channel estimator and a demodulator unit 560, a rate de-matcher 570 restores a rate matching, and a decoder 580 decodes the resulting bits to provide information bits 590.

A UE typically monitors multiple candidate locations for respective potential PDCCH receptions (PDCCH candidates) to decode respective candidate DCI formats in a slot. The locations are determined according to a search space for a respective DCI format. Monitoring PDCCH candidates means receiving and decoding the PDCCH candidates according to DCI formats the UE is configured to receive. A DCI format includes cyclic redundancy check (CRC) bits in order for the UE to confirm a correct detection of the DCI format. A DCI format type is identified by a radio network temporary identifier (RNTI) that scrambles the CRC bits. For a DCI format scheduling a PDSCH or a PUSCH to a single UE, the RNTI can be a cell RNTI (C-RNTI) and serves as a UE identifier.

For example, for a DCI format scheduling a PDSCH conveying system information (SI), the RNTI can be an SI-RNTI. For a DCI format scheduling a PDSCH providing a random-access response (RAR), the RNTI can be an RA-RNTI. For a DCI format scheduling a PDSCH providing paging information, the RNTI can be a P-RNTI. For a DCI format scheduling a PDSCH or a PUSCH to a single UE prior to UE establishing a radio resource control (RRC) connection with a serving gNB, the RNTI can be a temporary C-RNTI (TC-RNTI). For a DCI format providing TPC commands to a group of UEs, the RNTI can be a TPC-PUSCH-RNTI or a TPC-PUCCH-RNTI. Each RNTI type can be configured to a UE through higher-layer signaling such as RRC signaling. A DCI format scheduling PDSCH reception to a UE is also referred to as DL DCI format or DL assignment while a DCI format scheduling PUSCH transmission from a UE is also referred to as UL DCI format or UL grant.

A PDCCH transmission can be within a set of physical RBs (PRBs). A gNB can configure a UE one or more sets of PRBs, also referred to as control resource sets (CORESETs), for PDCCH receptions. A PDCCH reception can be in control channel elements (CCEs) that are included in a control resource set. A UE determines CCEs for a PDCCH reception based on a search space such as a UE-specific search space (USS) for PDCCH candidates associated with DCI formats having CRC scrambled by a RNTI, such as a C-RNTI, that is configured to the UE by UE-specific RRC signaling for scheduling unicast PDSCH reception or PUSCH transmission, and a common search space (CSS) for PDCCH candidates associated with DCI formats having CRC scrambled by other RNTIs. A set of CCEs that can be used for PDCCH transmission to a UE define a PDCCH candidate location. A property of a control resource set is transmission configuration indication (TCI) state that provides quasi co-location information of the DMRS antenna port for PDCCH reception.

FIG. 6 illustrates an example encoding process 600 for a DCI format according to embodiments of the present disclosure. An embodiment of the encoding process 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

A gNB separately encodes and transmits each DCI format in a respective PDCCH. A RNTI masks a CRC of the DCI format codeword in order to enable the UE to identify the DCI format. For example, the CRC and the RNTI can include, for example, 16 bits or 24 bits. The CRC of (non-coded) DCI format bits 610 is determined using a CRC computation unit 620, and the CRC is masked using an exclusive OR (XOR) operation unit 630 between CRC bits and RNTI bits 640. The XOR operation is defined as XOR(0,0)=0, XOR(0,1)=1, XOR(1,0)=1, XOR(1,1)=0. The masked CRC bits are appended to DCI format information bits using a CRC append unit 650. An encoder 660 performs channel coding (such as tail-biting convolutional coding or polar coding), followed by rate matching to allocated resources by rate matcher 670. Interleaving and modulation units 680 apply interleaving and modulation, such as QPSK, and the output control signal 690 is transmitted.

FIG. 7 illustrates an example decoding process 700 for a DCI format for use with a UE according to embodiments of the present disclosure. An embodiment of the decoding process 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. Other embodiments are used without departing from the scope of the present disclosure.

A received control signal 710 is demodulated and de-interleaved by a demodulator and a de-interleaver 720. A rate matching applied at a gNB transmitter is restored by rate matcher 730, and resulting bits are decoded by decoder 740. After decoding, a CRC extractor 750 extracts CRC bits and provides DCI format information bits 760. The DCI format information bits are de-masked 770 by an XOR operation with an RNTI 780 (when applicable) and a CRC check is performed by unit 790. When the CRC check succeeds (check-sum is zero), the DCI format information bits are considered to be valid. When the CRC check does not succeed, the DCI format information bits are considered to be invalid.

For each DL bandwidth part (BWP) configured to a UE in a serving cell, a UE can be provided by higher layer signaling a number of control resource sets. For each control resource set, the UE is provided: a control resource set index p; a demodulation reference-signal (DM-RS) scrambling sequence initialization value; a precoder granularity for a number of REGs in frequency where the UE can assume use of a same DM-RS precoder; a number of consecutive symbols; a set of resource blocks; CCE-to-REG mapping parameters; an antenna port quasi co-location, from a set of antenna port quasi co-locations, indicating quasi co-location information of the DM-RS antenna port for PDCCH reception; and an indication for a presence or absence of a transmission configuration indication (TCI) field for a DCI format 1_1 multiplexed in a PDCCH reception in control resource set p.

For each DL BWP configured to a UE in a serving cell, the UE is provided by higher layers with a number of search space sets where, for each search space set from the number search space sets, the UE is provided the following: a search space set index s; an association between the search space set s and a control resource set p; a PDCCH monitoring periodicity of $k_{p,s}$ slots and a PDCCH monitoring offset of $o_{p,s}$ slots; a PDCCH monitoring pattern within a slot, indicating first symbol(s) of the control resource set within a slot for PDCCH monitoring; a number of PDCCH candidates $M_{p,s}^{(L)}$ per CCE aggregation level L; and an indication that search space set s is either a common search space set or a UE-specific search space set.

For a search space set s associated with control resource set p, the CCE indexes for aggregation level L corresponding to PDCCH candidate $m_{s,n_{CI}}$ of the search space set in slot $n_{s,f}^{\mu}$ for a serving cell corresponding to carrier indicator field value $n_{CI}$ (also referred to as search space) are given as in Equation 1:

$$L \cdot \left\{ \left( Y_{p,n_{s,f}^{\mu}} + \left\lfloor \frac{m_{s,n_{CI}} \cdot N_{CCE,p}}{L \cdot M_{p,s,max}^{(L)}} \right\rfloor + n_{CI} \right) \bmod \left\lfloor \frac{N_{CCE,p}}{L} \right\rfloor \right\} + i \qquad \text{Equation 1}$$

In Equation 1, for any common search space, $Y_{p,n_{s,f}^{\mu}}=0$; for a UE-specific search space, $Y_{p,n_{s,f}^{\mu}}=(A_p \cdot Y_{p,n_{s,f}^{\mu}-1}) \bmod D$, $Y_{p,-1}=n_{RNTI} \neq 0$, $A_0=39827$ for p mod 3=0, $A_1=39829$ for p mod 3=1, $A_2=39839$ for p mod 3=2, and D=65537; i=0, . . . , L−1; $N_{CCE,p}$ is the number of CCEs, numbered from 0 to $N_{CCE,p}-1$, in control resource set p; $n_{CI}$ is the carrier indicator field value if the UE is configured with a carrier indicator field; otherwise, including for any common search space, $n_{CI}=0$; $m_{s,n_{CI}}=0, \ldots, M_{p,s,n_{CI}}^{(L)}-1$, where $M_{p,s,n_{CI}}^{(L)}$ is the number of PDCCH candidates the UE is configured to monitor for aggregation level L for a serving cell corresponding to $n_{CI}$ and a search space set s; for any common search space, $M_{p,s,max}^{(L)}=M_{p,s,0}^{(L)}$; for a UE-specific search space, $M_{p,s,max}^{(L)}$ is the maximum of $M_{p,s,n_{CI}}^{(L)}$ across all configured $n_{CI}$ values for a CCE aggregation level L of search space set s in control resource set p; and the RNTI value used for $n_{RNTI}$.

When a UE indicates a carrier aggregation capability larger than 4 serving cells, the UE indicates a number of DL cells $N_{cells}^{cap}$ that the UE can monitor a maximum number of PDCCH candidates and non-overlapping CCEs per slot when the UE is configured for carrier aggregation operation over more than 4 cells.

When a UE is configured with $N_{cells}^{DL,\mu}$ downlink cells with DL BWPs having SCS configuration $\mu$ where $$\sum_{\mu=0}^{3} N_{cells}^{DL,\mu} \le N_{cells}^{cap},$$

the UE is not required to monitor, on the active DL BWP of the scheduling cell, more than $M_{PDCCH}^{total,slot,\mu} = M_{PDCCH}^{max,slot,\mu}$ PDCCH candidates or more than $C_{PDCCH}^{total,slot,\mu} = C_{PDCCH}^{max,slot,\mu}$ non-overlapped CCEs per slot for each scheduled cell where $M_{PDCCH}^{max,slot,\mu}$ and $C_{PDCCH}^{max,slot,\mu}$ are respectively a maximum number of PDCCH candidates and a maximum number of non-overlapping CCEs that a UE can monitor/process per slot for SCS configuration $\mu$.

When a UE is configured with $N_{cells}^{DL,\mu}$ downlink cells with DL BWPs having SCS configuration $\mu$, where $$\sum_{\mu=0}^{3} N_{cells}^{DL,\mu} > N_{cells}^{cap},$$

a DL BWP of an activated cell is the active DL BWP of the activated cell, and a DL BWP of a deactivated cell is the DL BWP with index provided by higher layers for the deactivated cell, the UE is not required to monitor more than $$M_{PDCCH}^{total,slot,\mu} = \left\lfloor N_{cells}^{cap} \cdot M_{PDCCH}^{max,slot,\mu} \cdot N_{cells}^{DL,\mu} \Big/ \sum_{j=0}^{3} N_{cells}^{DL,\mu} \right\rfloor PDCCH$$

candidates or more than $$C_{PDCCH}^{total,slot,\mu} = \left\lfloor N_{cells}^{cap} \cdot C_{PDCCH}^{max,slot,\mu} \cdot N_{cells}^{DL,\mu} \Big/ \sum_{j=0}^{3} N_{cells}^{DL,\mu} \right\rfloor$$

non-overlapped CCEs per slot on the active DL BWP(s) of scheduling cell(s) from the $N_{cells}^{DL,\mu}$ downlink cells.

$$M_{PDCCH}^{total,slot,\mu} = \left\lfloor N_{cells}^{cap} \cdot M_{PDCCH}^{max,slot,\mu} \Big/ \sum_{j=0}^{3} N_{cells}^{DL,j} \right\rfloor = \left\lfloor N_{cells}^{cap} \cdot M_{PDCCH}^{max,slot,\mu} / N_{cells}^{DL,\mu} \right\rfloor.$$

A PUCCH can be transmitted according to one from multiple PUCCH formats. A PUCCH format corresponds to a structure that is designed for a particular UCI payload range as different UCI payloads require different PUCCH transmission structures to improve an associated UCI BLER. A PUCCH transmission is also associated with a transmission configuration indicator (TCI) state providing a spatial domain filter for a PUCCH transmission. A PUCCH can be used to convey HARQ-ACK information, SR, or periodic/semi-persistent CSI and their combinations.

A UE can be configured for operation with multiple bandwidth parts (BWP) in a DL system BW (DL BWPs) or in an UL system BW (UL BWPs). At a given time, only one DL BWP and only one UL BWP are active for the UE. Therefore, DL receptions are on the active DL BWP and UL transmissions are on the active UL BWP. It is also possible for more than one DL BWPs or UL BWPs to be active at a same time and then more than one DL receptions or UL transmissions can simultaneously occur in the more than one DL BWPs or UL BWPs, respectively. Configurations of various parameters, such as search space sets configuration for PDCCH reception or PUCCH resources for PUCCH transmission, can be separately provided for each respective BWP.

A primary purpose for BWP operation is to enable power savings for a UE. When the UE has data to transmit or receive, a large BWP can be used and, for example, more than one search space sets can be configured with short monitoring periodicities. When the UE does not have data to transmit or receive, a small BWP can be used and, for example, a single search space set can be configured with longer monitoring periodicity.

Another mechanism for UE power savings can be an operation with discontinuous reception (e.g., C-DRX operation) when a UE has an RRC connection with a serving gNB (e.g., RRC_CONNECTED mode). When a UE is in RRC_CONNECTED mode, the UE operates in C-DRX mode that is associated with parameters "on duration" and "inactivity timer". During the "on duration" period, the UE monitors PDCCH (attempts to detect DCI formats) in configured search space sets. When the UE detects a DCI format scheduling a PDSCH reception or a PUSCH transmission during the "on duration" period, the UE starts the "inactivity timer" and continues to monitor PDCCH until the "inactivity timer" expires and the UE goes into sleep mode for power saving.

A configuration for values of the "on duration" and "inactivity timer" is determined by a serving gNB and there is no UE feedback for preferred values. For example, based on a power level or on the power consumption for a specific carrier or BWP, the UE can suggest values for the "on duration" and "inactivity timer". For example, a UE with low battery power can suggest a larger value for the "on duration" period and a smaller value for the "inactivity timer".

Most of the UE modem power is often consumed, depending on the data traffic application, on monitoring PDCCH while in many C-DRX periods the UE does not detect any DCI format and, even in C-DRX periods where the UE detects a DCI format, the inactivity timer expires without the UE detecting another DCI format. For this reason, use of "wake-up signalling" (WUS) or "go-to-sleep" (GTS) signalling have been considered in order to respectively indicate to a UE to wake-up and start monitoring PDCCH, instead of the UE doing so automatically at the start of each C-DRX period, or to stop monitoring PDCCH until the start of the next C-DRX period or until the UE detects a corresponding WUS.

For certain frequency bands, it is mandatory for a UE to support operation with 4 receiver antennas. Such a large number of receiver antennas results to large UE power consumption and may not be necessary or preferable when the UE is to receive small data packets, or when the UE is in good coverage, or when the UE has low battery power. A recommendation by the UE for a preferred number of receiver antennas, either directly or indirectly, can also facilitate reduced UE power consumption.

Similar to adapting a number of UE receiver antennas, a number of activated secondary cells (SCells) for a UE can be adapted according to a buffer status for the UE. Existing networks support activation/deactivation of SCells by MAC layer signaling but this often requires material delays particularly for CSI measurements and feedback after a SCell is activated and, due to this reason, this feature is often not used by a serving gNB as there is no incentive for the gNB to deactivate (and subsequently activate) SCells. Instead, a serving gNB typically maintains a configured SCell for a UE in the activated state even when there is no data in the buffer for transmission to the UE.

Cross-slot scheduling of PDSCH receptions or PUSCH transmissions is also considered to enable UE power savings. A UE can perform light sleep for a period indicated by the delay between scheduling PDCCH and the scheduled PDSCH/PUSCH reception/transmission, denoted as K0/K2, respectively. However, a power saving period is constrained by the start of a next PDCCH monitoring occasion. The UE may switch from a light sleep mode to a regular active mode as long as the next PDCCH monitoring occasion starts, regardless of whether or not the timer associated with current K0/K2 expires.

NR supports semi-static (Type-1) and dynamic (Type-2) HARQ-ACK codebook determination where a UE provides HARQ-ACK information for a set of PDSCH reception occasions in one PUCCH or PUSCH transmission. This enables the UE to save power by reducing a number of PUCCH transmissions to provide HARQ-ACK information and, for unpaired spectrum operation, reducing an overhead for switching between receptions in a DL and transmissions in an UL. For a semi-static HARQ-ACK codebook, the UE determines a HARQ-ACK codebook size by a set of slot timing values K1 for PUCCH transmissions with HARQ-ACK information. The UE can be provided the set of slot timing values K1 by a higher layer parameter, such as dl_DataTo_UL_ACK, for a DCI format 1_1.

For example, a set of slot timing values K1 can include 8 elements with values ranging from 0 to 15 or 31. However, a semi-static configuration of slot timing values may not be efficient in adapting to different data traffic loads. Also, UE power saving gains are not balanced for different numerologies. For example, with a same configuration for slot timing values, a UE operating in frequency range 2 (FR2—for carrier frequencies above 6 GHz) requires more power consumption than a UE operating in frequency range 1 (FR1—for carrier frequencies below 6 GHz). This is due to more frequent transmissions of HARQ-ACK information and, for unpaired spectrum operation such as in FR2, due to an increased overhead for DL to UL switching.

To reduce a number of non-overlapping CCEs that PDCCH candidates occupy, as determined according to a search space determination as in Equation 1, a nested search space can be used. For example, with a nested search space, a search space can be determined according to Equation 1 for predetermined PDCCH candidates and a search space for remaining PDCCH candidates can include only the CCEs of the predetermined PDCCH candidates using either Equation 1 or some other structure.

For example, the predetermined PDCCH candidates can be the (non-zero) PDCCH candidates with the largest CCE aggregation level. For example, the predetermined PDCCH candidates can be the ones requiring the largest number of CCEs where, for example 4 PDCCH candidates with aggregation level of 4 CCEs require 16 CCEs that are more than the 8 CCEs required by 1 PDCCH candidate with aggregation level of 1 CCE.

A tradeoff between a nested search space and a search space according to Equation 1 is that the former reduces a number of non-overlapping CCEs while the latter reduces a blocking probability for PDCCH transmissions. Therefore, there is a need to enable a gNB to adapt a search space selection for a UE according to whether the gNB prioritizes the former or the latter part of the tradeoff for the UE and to even enable the gNB to apply both parts of the tradeoff.

Therefore, there is a need to indicate to a UE whether or not to monitor PDCCH candidates for a number of C-DRX periods or for a number of PDCCH monitoring occasions within a C-DRX period.

There is another need to provide means to a UE to indicate to a serving gNB preferred configurations for transmissions and receptions.

There is another need to enable a UE to perform fast SCell activation and deactivation.

There is another need to design new operating modes for communication between a UE and a serving gNB that enable UE power savings without penalizing network operation.

There is another need to adapt a set of slot timing values K1 for both semi-static and dynamic HARQ-ACK codebook determination with respect to a number of active SCells and a corresponding subcarrier spacing configuration.

There is another need for a MN, a SN, and a UE to have a same understanding for a number of PDCCH candidates the UE is expected to monitor per slot and for a number of non-overlapping CCEs the UE is expected to be able to perform channel estimation per slot.

Finally, there is a need to set a processing time for scheduling PDSCH/PUSCH and to combine an activation/deactivation of secondary carriers together with dynamic adaptation on processing time for scheduling.

The present disclosure relates to a pre-$5^{th}$-generation (5G) or 5G communication system to be provided for supporting higher data rates beyond $4^{th}$-generation (4G) communication system such as long term evolution (LTE). The present disclosure relates to indicating to a UE whether or not to monitor PDCCH candidates for a C-DRX period or for a PDCCH monitoring occasion within a C-DRX period. The present disclosure also relates to providing means to a UE to indicate to a serving gNB preferred configurations for transmissions and receptions. The present disclosure further relates to enabling a UE to perform fast SCell activation and deactivation. The present disclosure additionally relates to designing new operating modes for communication between a UE and a serving gNB that enable UE power savings without penalizing network operation.

The present disclosure also relates to adapting a set of slot timing value K1 for both semi-static and dynamic HARQ-ACK codebook determination with respect to a number of active SCells and a corresponding subcarrier spacing configuration. The present disclosure further relates to establishing a same understanding among a MN, a SN, and a UE for a number of PDCCH candidates the UE is expected to monitor per slot and for a number of non-overlapping CCEs the UE is expected to be able to perform channel estimation per slot. The present disclosure additionally relates to setting a processing time for scheduling PDSCH/PUSCH and to combining an activation/deactivation of secondary carriers together with dynamic adaptation on processing time for scheduling.

In one embodiment, signaling designs are provided for indicating to a UE to skip PDCCH monitoring for a number of C-DRX cycles, or to skip PDCCH monitoring within a C-DRX cycle, or to adjust parameters for a number of C-DRX cycles.

An indication for an adjustment to a number of configured PDCCH candidates that a UE monitors in a search space set can be provided by a DCI format. A DCI format can be decoded by multiple UEs (UE-common DCI format) in a PDCCH received in a common search space or can be UE-specific in a PDCCH received in a UE-specific search space. Enhancements to the structure of a DCI format and of the contents for the information it provides with respect to PDCCH monitoring by a UE are now described.

In case of a UE-common DCI format, a UE is configured with a RNTI, referred to for example as PS-RNTI, for a DCI format and with a location for a field that includes a number of consecutive bits in a DCI format. The UE can be configured one location/field corresponding to one cell or to a group of cells that can be for example indicated by higher layers or can be configured multiple locations/fields corresponding to respective multiple cells or multiple groups of cells. For brevity, a DCI format is referred to as a DCI format P.

For indication of PDCCH monitoring per C-DRX period to a UE, the UE monitors PDCCH for a DCI format P only at the beginning of a C-DRX period or at one or more times/occasions provided by higher layers prior to the beginning of a C-DRX period, such as for example 1 msec prior to the beginning of a C-DRX period, in order to provide to the UE sufficient processing time to apply the indications by a DCI format P at the beginning of the C-DRX period and to potentially perform CSI-RS measurements and provide a CSI report prior to the beginning of the C-DRX period.

A number of PDCCH candidates per CCE aggregation level for a PDCCH reception for a DCI format P can be configured to a UE or, to reduce a number of decoding operations, expedite decoding of a DCI format P, and minimize associated UE power consumption, only one or two CCE aggregation levels can be configured to the UE for monitoring PDCCH with a DCI format P and a number of PDCCH candidates for the CCE aggregation level can be also configured, up to a predetermined maximum number such as 2 or 4, or can be defined in a system operation. The one or two CCE aggregation levels for a PDCCH that includes the DCI format P can also be defined in the system operation.

A number of bits in the field (either in a UE-specific DCI format or in a UE-common DCI format) can be one or more. In case of one bit, the indication can be whether or not the UE skips PDCCH monitoring in the next C-DRX period or in a number of C-DRX periods that the UE is provided in advance by higher layer signaling. For example, a value of "0" can indicate skipping of PDCCH monitoring while a value of "1" can indicate PDCCH monitoring in the next C-DRX period.

In case of multiple bits, in one embodiment, the indication can include adjustments to the parameters of the C-DRX period by indicating values for the "on duration" parameter and the "inactivity timer" parameter from a set of corresponding values that the UE is provided in advance by higher layers. The indication can also include adjustments to a number of PDCCH candidates a UE is configured to monitor in order to detect DCI formats scheduling PDSCH receptions or PUSCH transmissions.

For example, in case of 2 bits, a "00" value can indicate to a UE to skip PDCCH monitoring in a next C-DRX period while a "01," "10" or "11" value can respectively indicate a first, second, or third set of "on duration, inactivity timer" values where the three sets of "on duration, inactivity timer" values were provided in advance to the UE by higher layers.

In another embodiment, the indication can be a number of slots in a C-DRX period, from a set of numbers of slots that the UE is provided in advance by higher layer signaling or are defined in a system operation, that the UE skips PDCCH monitoring. For example, in case of 2 bits, a "00" value can indicate to a UE to monitor PDCCH in every slot of a C-DRX period (i.e., not skip PDCCH monitoring) while a "01," "10" or "11" value can respectively indicate to a UE to skip PDCCH monitoring for N1, N2, or N3 slots where the values of N1, N2, and N3 are provided to the UE by higher layers.

For example, for a DCI format P reception periodicity of N slots and in case of 2 bits, a "00" value can indicate to a UE to monitor PDCCH in every slot of a C-DRX period (i.e., not skip PDCCH monitoring) while a "01" "10," or "11" value can respectively indicate to a UE to skip PDCCH monitoring in every fourth slot of the next N slots (either including or excluding the slot of the DCI format P reception), in every second slot of the next N slots, or in all next N slots, where N can be provided to the UE by higher layers or can include all remaining slots in the C-DRX period. For PDCCH monitoring occasions where the UE skips PDCCH monitoring, the UE still increments the Inactivity Timer.

The UE can also be configured by higher layers a periodicity for a DCI format P reception and the UE applies a corresponding configuration for a set "on duration, inactivity timer" values for all C-DRX periods until a C-DRX period that corresponds to a next DCI format P reception. When the UE fails to detect a DCI format P at a corresponding monitoring occasion, the UE assumes maximum values, from the configured values, for the on duration and for the inactivity timer. This ensures that the PDCCH monitoring occasions are a superset of the ones indicated by a DCI format P and the UE does not miss reception of a PDCCH transmission from the gNB.

Alternatively, the UE can assume a predetermined set of values from the configured sets of values, such as the first set of "on duration, inactivity timer" values and it can be up to gNB implementation to ensure appropriate values, such as maximum values, in case a UE fails to detect a DCI format P. In case of cross-carrier scheduling, a same set of "on duration, inactivity timer" values can apply for each search space set corresponding to each scheduled cell with a same scheduling cell.

Figure 8:
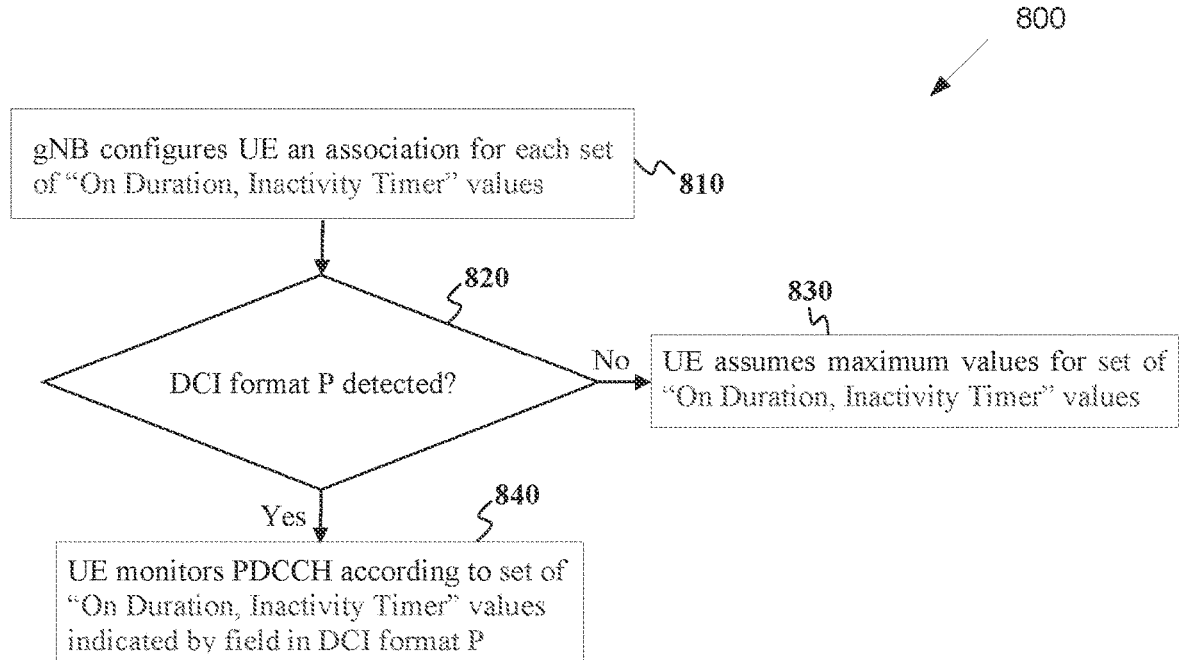
FIG. 8 illustrates a flowchart of a method for a UE to adjust parameters for a. C-DRX period according to embodiments of the present disclosure.

FIG. 8 illustrates a flowchart of a method 800 for a UE to adjust parameters for a C-DRX period according to embodiments of the present disclosure. An embodiment of the method 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure.

Using higher layer signaling, a gNB configures a UE with a RNTI for a DCI format P, a periodicity for a DCI format P reception, one or more offsets for PDCCH monitoring prior to a start of a DRX-cycle for DCI format P, and with a location of a field in the DCI format P that indicates a configuration for a set of values for "on duration" and "inactivity timer" parameters for C-DRX periods until a next reception of DCI format P in step 810. The UE determines whether or not the UE detects the DCI format P at a configured reception time in step 820. When the UE does not detect the DCI format P, the UE assumes maximum values, from the respective configured values, for a set of "on duration, inactivity timer" values in step 830. When the UE detects the DCI format P, the UE monitors PDCCH in a C-DRX period according to a set of "on duration, inactivity timer" values indicated by a corresponding field for the UE in the DCI format P in step 840. When the field indicates a predetermined value, such as "00", the UE can skip PDCCH decoding for all C-DRX periods until a next monitoring occasion for the DCI format P.

Each set of "on duration, inactivity timer" values can be configured to be associated with a set of search space sets that the UE is configured in advance by higher layers. For example, a UE can be configured to monitor up to four search space sets in a C-DRX period for PDCCH receptions conveying UE-specific DCI formats and a first, second, and third set of "on duration, inactivity timer" values can be respectively associated by higher layer signaling with a first, second, and third subsets of the set of the search space sets.

For example the first set of "on duration, inactivity timer" values can be associated with the first two search space sets (in the order of configuration), the second set of "on duration, inactivity timer" values can be associated with the first three search space sets, and the third set of "on duration, inactivity timer" values can be associated with all four search space sets.

Each set of "on duration, inactivity timer" values can be configured to be associated with a percentage (or fraction) of PDCCH candidates that the UE is configured in advance by higher layers. For example, a UE can be configured to monitor PDCCH candidates for scheduling of PDSCH receptions or PUSCH transmissions in a number of search space sets in a C-DRX period. A first, second, and third set of "on duration, inactivity timer" values can be respectively associated by higher layer signaling with a first, second, and third percentages for a number of PDCCH candidates per CCE aggregation level per search space set, where the floor function or the ceiling function can apply if a percentage does not result to an integer number of PDCCH candidates for a respective CCE aggregation level in a search space set.

For example the first set of "on duration, inactivity timer" values can be associated with all the PDCCH candidates per CCE aggregation level in each search space set, the second set of "on duration, inactivity timer" values can be associated with ⅔ of the PDCCH candidates per CCE aggregation level in each search space set, and the third set of "on duration, inactivity Timer" values can be associated with ⅓ of the PDCCH candidates per CCE aggregation level in each search space set.

The fractions can also be configured by higher layers instead of being predetermined as in the previous example with the possible exception of the first value that can always be one. As an alternative, instead of the first, second, and third sets of "on duration, inactivity timer" values to be associated with respective first, second, and third fractions of PDCCH candidates per CCE aggregation level per search space set, three separate configurations for PDCCH candidates per CCE aggregation level per search space set can be provided and can be associated with the three corresponding sets of "on duration, inactivity timer" values.

When a UE fails to detect a DCI format P at a corresponding PDCCH monitoring occasion, the UE monitors PDCCH for a corresponding C-DRX period according to default settings such as for example according to a first configuration, such as the configuration with the maximum number of candidates per CCE aggregation level and per search space set (or the configuration corresponding to a fraction value of 1), for a number of PDCCH candidates per CCE aggregation level for a respective search space set.

Figure 9:
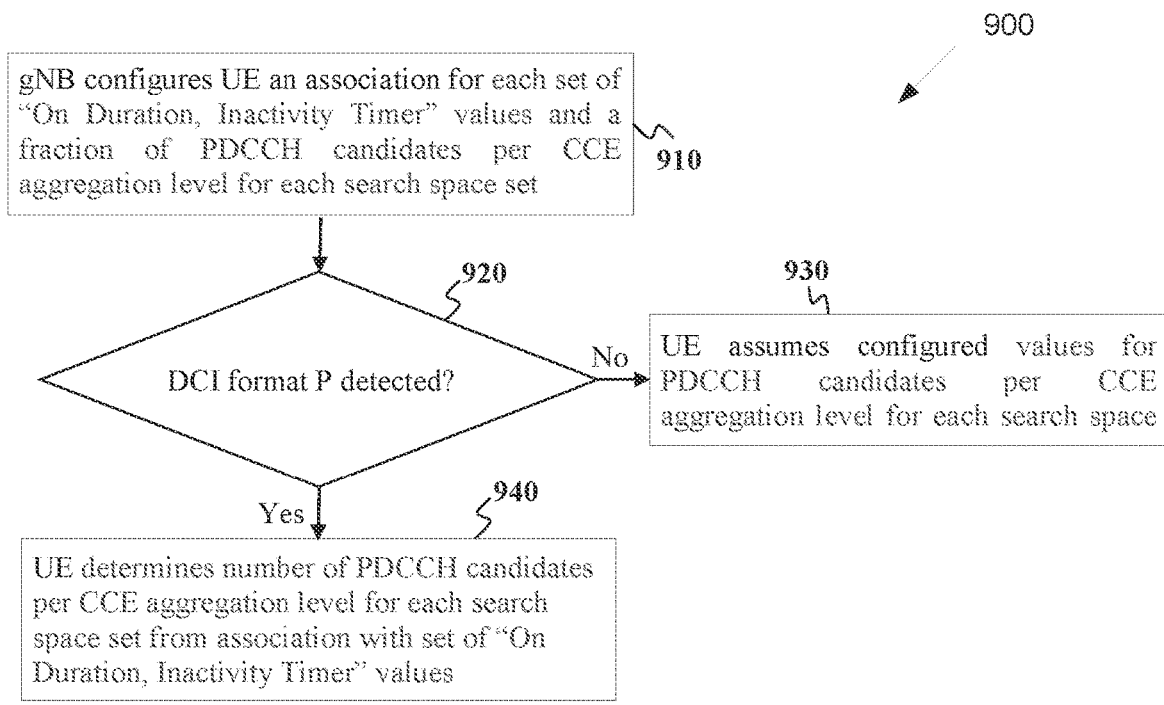
FIG. 9 illustrates a flowchart of a method for a UE to adjust a number of PDCCH candidates per CCE aggregation level and per search space set according to embodiments of the present disclosure.

FIG. 9 illustrates a flowchart of a method 900 for a UE to adjust a number of PDCCH candidates per CCE aggregation level and per search space set according to embodiments of the present disclosure. An embodiment of the method 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions. Other embodiments are used without departing from the scope of the present disclosure.

Using higher layer signaling, a gNB configures a UE an association between each set of "on duration, inactivity timer" values and a fraction of PDCCH candidates, relative to a configured number of PDCCH candidates, per CCE aggregation level for each search space set in step 910.

The UE determines whether or not the UE detects a DCI format P at a configured reception time in step 920. When the UE does not detect a DCI format P, the UE assumes the configured number of PDCCH candidates per CCE aggregation level for each search space set in step 930. When the UE detects a DCI format P, the UE determines a set of "on duration, inactivity timer" values, for example as described in FIG. 8, and based on a corresponding association with a fraction of PDCCH candidates, the UE determines a number of PDCCH candidates per CCE aggregation level for each search space set in step 940.

In order to minimize an overhead associated with a DCI format P or to increase a number of UEs that the DCI format P can address or an amount of information that a DCI format P can provide, a CRC length for a DCI format P can be smaller than a CRC length for other DCI formats such as DCI formats scheduling PDSCH receptions or PUSCH transmissions.

For example, a CRC length for a DCI format P can be 8 bits or 16 bits while a CRC length for the other DCI formats can be 24 bits. When a serving gNB does not transmit a DCI format P but a UE incorrectly detects a DCI format P due to a false CRC check, the worst outcome is that a UE may not monitor PDCCH for a C-DRX period where the serving gNB expects the UE to monitor PDCCH but it is possible for the gNB to realize this through DTX detection of a PUCCH conveying corresponding HARQ-ACK information if the gNB schedules PDSCH receptions to the UE or through DTX detection of a PUSCH reception if the gNB schedules PUSCH transmissions to the UE.

When a UE is configured for operation with carrier aggregation, the UE can be configured a number of fields in a DCI format P equal to a corresponding number of cells or groups of cells and the previously described functionality of a DCI format P for single cell operation can be parallelized for the corresponding number of fields to a number of cells or groups of cells in the operation with carrier aggregation. The cells in a group of cells can be configured in advance by higher layers or be implicitly determined by the cell index and a number of cells in a group of cells.

An adaptation of set of "on duration, inactivity timer" values for a C-DRX cycle can also depend on a DL BWP used for receptions by a UE. For example, a configuration for a set of "on duration, inactivity timer" values can be independently provided for each BWP, or for a first BWP and remaining BWPs.

For example, smaller values for the "on duration" and for the "inactivity timer" can be configured in a first DL BWP that is used when the gNB does not have a large amount of data in the gNB's buffer for the UE and high data rates are not required and larger values for the "on duration" and for the "inactivity timer" can be configured in a second DL BWP that is used when the gNB wants to achieve high data rates for the UE.

Figure 10:
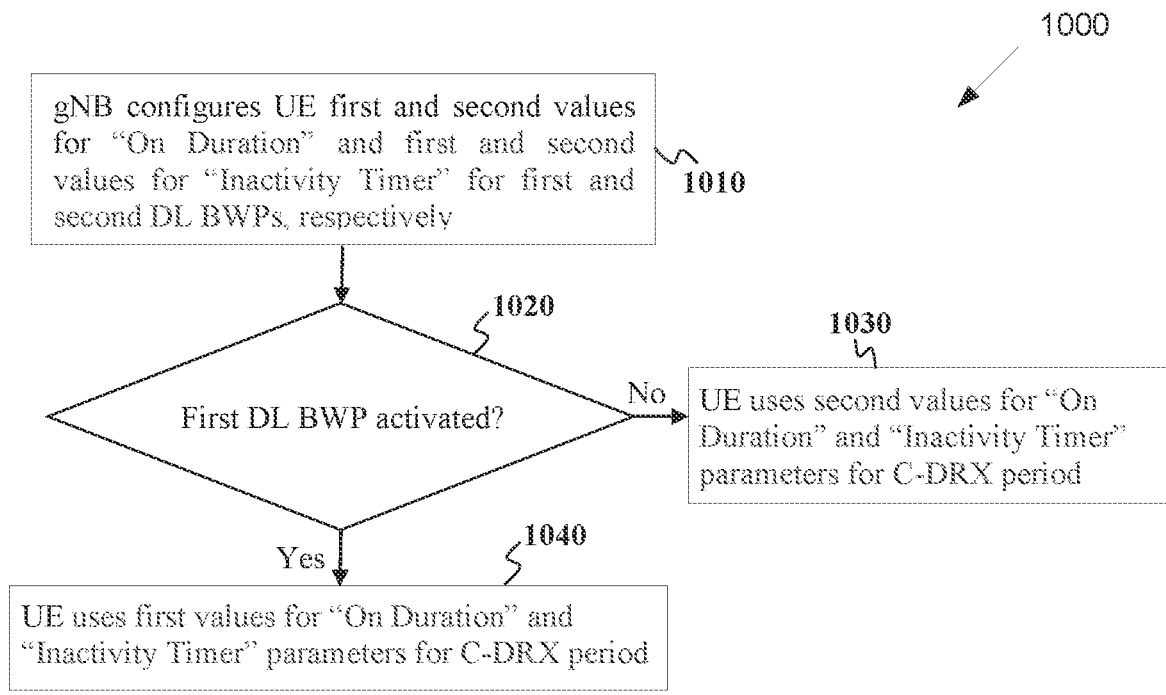
FIG. 10 illustrates a flowchart of a method for a UE determination for a number of PDCCH candidates per CCE aggregation level and per search space set depending on a corresponding DL BWP according to embodiments of the present disclosure.

FIG. 10 illustrates a flowchart of a method 1000 for a UE determination for a number of PDCCH candidates per CCE aggregation level and per search space set depending on a corresponding DL BWP according to embodiments of the present disclosure. An embodiment of the method 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions. Other embodiments are used without departing from the scope of the present disclosure.

A gNB configures, using higher layer signaling, a first value for an "on duration" and a first value for an "inactivity timer" associated with a C-DRX period in a first DL BWP and a second value for an "on duration" and a second value for an "inactivity timer" associated with a C-DRX period in a second DL BWP in step 1010. The UE determines whether an activated DL BWP is the first DL BWP or the second DL BWP in step 1020. When the activated DL BWP is the first DL BWP, the UE uses the first values for the "on duration" and the "inactivity timer" parameters for a C-DRX period in step 1030. When the activated DL BWP is the second DL BWP, the UE uses the second values for the "on duration" and the "inactivity timer" parameters for a C-DRX period in step 1040.

An indication by a DCI format P (that can be either UE-common or UE-specific such as a DCI format 0_1 or a DCI format 1_1) may not apply in slots or in PDCCH monitoring occasions where a UE also monitors PDCCH in a common search space since the UE needs to anyway have the UE's radio-frequency active and decode at least one DCI format. This can be further restricted to the common search space corresponding to DCI formats scheduling a PDSCH receptions, such as DCI formats with CRC scrambled by an SI-RNTI, or an RA-RNTI, or a P-RNTI, as for DCI formats that do not schedule PDSCH reception, such as a DCI format with CRC scrambled by a TPC-PUSCH-RNTI, TPC-PUCCH-RNTI, or a SFI-RNTI, the UE can still save power as the UE does not need to be prepared to receive a PDSCH. Therefore, a UE can decode UE-specific DCI formats at least in PDCCH monitoring occasions or slots where the UE decodes a UE-common DCI format that schedules a PDSCH reception.

Dynamic Activation of Secondary Cells

A primary source of delay for an activation of a secondary cell is associated with a delay for a UE to provide a CSI feedback to a serving gNB for the secondary cell. Further, the CSI feedback may indicate a channel quality that is not sufficiently good for the gNB to schedule PDSCH transmissions to the UE in the secondary cell. Additional latency is then required for the gNB to activate another set of secondary cells for the UE, obtain corresponding CSI feedback, and deactivate cells that are not associated with sufficiently good CSI feedback.

To avoid this delay shortcoming in activating secondary cells, LTE operations introduced a new SCell state, so-called dormant state, where a UE can measure and report periodic CSI feedback for the SCell while the new SCell state is otherwise same as the deactivated state and the UE does not monitor PDCCH for that SCell or transmit/receive other signaling. However, unlike LTE where the existence of CRS in every subframe or the existence of periodic CSI-RS enables periodic CSI measurement at predetermined time instances, a CRS or a periodic CSI-RS may not exist for a new radio system. Then, the UE needs to be signaled a non-zero power CSI-RS (NZP CSI-RS) configuration for a corresponding deactivated SCell in order for the UE to measure CSI and provide a CSI report to the gNB.

A UE can be configured by higher layers a CSI-RS-RNTI for scrambling a CRC of a DCI format that is for brevity referred to as a DCI format C. The UE is also configured by higher layers one or more locations for respective fields in a DCI format C where each field corresponds either to an SCell or to a group of SCells where a respective SCell index or respective SCell indexes in the group of SCells is configured by higher layers.

The field is used to indicate an NZP CSI-RS resource configuration for a NZP CSI-RS reception by the UE on a corresponding SCell or group of SCells that can include all configured cells or all cells that are not activated. The NZP CSI-RS reception is used by the UE to measure and report CSI for the SCell or the group of SCells.

The field can include a number of bits equal to ceil(log$_2$ ($n_{NZP}$+1)) where ceil( ) is the ceiling function that rounds a number to a next larger integer and $n_{NZP}$ is a number of NZP CSI-RS resource configurations that can be indicated for an SCell by a DCI format C. For example, if the NZP CSI-RS resource configuration is limited to one, then a field in a DCI format C includes one bit with, for example, a value of "0" indicating no NZP CSI-RS reception for a corresponding SCell (or group of SCells) and hence no CSI measurement and reporting and a value of "1" indicating the NZP CSI-RS reception for the corresponding SCell.

If a UE is capable to simultaneously receive over T cells and the UE has A active cells, the UE can simultaneously receive NZP CSI-RS in T-A cells. If a number of SCells indicated to a UE by a DCI format C for NZP CSI-RS reception is not larger than T-A, the UE can simultaneously receive NZP CSI-RS in the indicated SCells according to respective NZP CSI-RS resource configurations.

For example, the NZP CSI-RS reception can be over same symbols of a same slot. When a number of SCells indicated to a UE by a DCI format C for NZP CSI-RS reception is larger than T-A, the UE can simultaneously receive NZP CSI-RS in the first T-A SCells, according to respective cell indexes and according to the respective NZP CSI-RS resource configurations, continue with the next T-A SCells and so on. When the UE cannot receive NZP CSI-RS simultaneously in all indicated SCells and the UE needs to retune the UE's radio-frequency, the NZP CSI-RS reception in successive T-A SCells can be in different successive slots that support ZP CSI-RS reception, such as non-uplink slots. A DL BWP for NZP CSI-RS reception in a non-activated cell can be a reference DL BWP such as an initial DL BWP indicated by higher layers for each respective SCell.

A DCI format C can also include a PUCCH resource (including a slot time offset relative to the slot for the reception of DCI format C) for the UE to transmit the associated CSI reports in a PUCCH and a TPC command to adjust a transmission power of the PUCCH.

Figure 11:
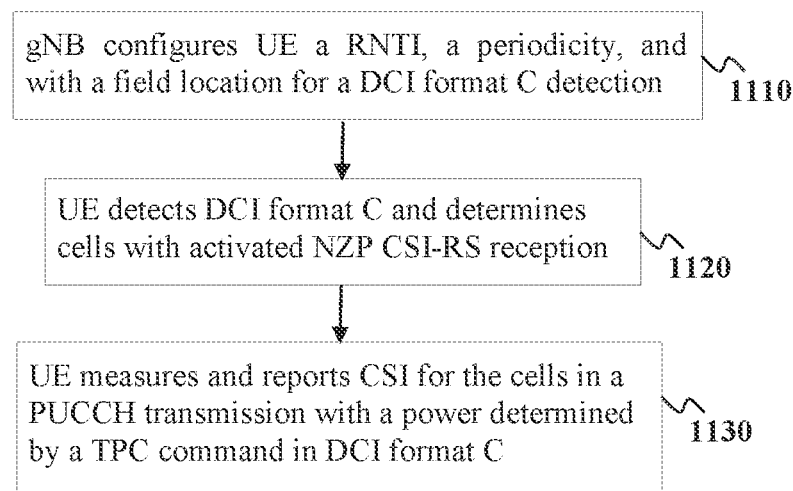
FIG. 11 illustrates a flowchart of a method for a UE to measure and report CSI for a set of cells according to embodiments of the present disclosure.

FIG. 11 illustrates a flowchart of a method 1100 for a UE to measure and report CST for a set of cells according to embodiments of the present disclosure. An embodiment of the method 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions. Other embodiments are used without departing from the scope of the present disclosure.

A gNB configures a UE with a RNTI for a DCI format C, a search space set including a periodicity for the DCI format C reception, and with a location of a field in the DCI format C that indicates a configuration for a NZP-CSI-RS reception or for an activation of a CSI-RS reception in case there is only a single configuration that is provided in advance by higher layer signaling in step 1410. In addition to an activation of a CSI-RS reception, the field or additional respective fields can include a TPC command for determining a power for a PUCCH transmission that includes one or more CSI reports, a corresponding PUCCH resource, and a slot timing offset unless they are configured in advance by higher layers or specified.

The activation of a CSI reception can be for all cells, or only for non-activated cells, or only for a group of cells that includes one or more cells and is configured by higher layers. Upon detection of a DCI format C, the UE determines whether a corresponding field indicates activation of CSI-RS reception for a cell in step 1420. When it does, the UE performs a measurement based on the CSI-RS, obtains a CSI, and reports the CSI for the applicable cells in a PUCCH that the UE transmits with a power determined using the TPC command and the indicated PUCCH resource and slot timing offset in step 1430.

Reporting of Preferred Configurations

A UE can report one or more configurations for transmissions to a serving gNB or for receptions from the serving gNB that are preferred by the UE, for example according to the UE's power status. For example, when the UE has full battery power or is connected to a power supply, the UE can request a first configuration that can be beneficial, for example, for coverage or increased data rates. For example, when the UE has low battery power, the UE can request a second configuration that can prioritize, for example, reduced UE power consumption over increased data rates. Parameters in a configuration can include a number of transmitter antennas or spatial layers, a number of receiver antennas or spatial layers, a number of activated cells, a PDCCH monitoring periodicity, and so on.

Each of the one or more configurations that a UE reports to a serving gNB can be represented by a value of a field. For example, a field of 2 bits can be used to indicate with respective values of "00," "01," "10," and "11," one of the following four configurations {2 receiver antennas, 1 spatial layer, first group of activated cells}, {4 receiver antennas, 2 spatial layers, first group of activated cells}, {4 receiver antennas, 2 spatial layers, second group of activated cells}, {2 receiver antennas, 2 spatial layers, third group of activated cells}.

A number of preferred configurations that a UE can report can be predetermined in a system operation, such as for example one configuration, or be configured to the UE by higher layers. When the UE is configured to report more than one preferred configurations, the order of preference can be according to the order of the corresponding fields in the report. The report of the one or more preferred UE configurations can be periodic or triggered by the UE or by the gNB.

For a periodic report, the UE can be configured a reporting periodicity and a PUCCH resource for transmission of a PUCCH that includes the report. The periodic report of preferred configurations can coincide with a periodic/semi-persistent CSI report, although with same or smaller periodicity, and the UE can then combine the two reports in a same PUCCH. When a number of available REs (excluding REs used for DMRS transmission) in a PUCCH resource is not sufficient for control information in a respective PUCCH transmission to achieve a target code rate that, for example, the UE is configured by higher layers, the UE can prioritize transmission of the configuration report over transmission of CSI reports.

For a triggered report, the UE can include the report in a MAC control element (MAC CE) the UE transmits in a PUSCH. This also enables a serving gNB to determine whether or not the report is correctly received (by performing a CRC check for a reception of an associated transport block). A report can also be requested by a serving gNB, for example through a field in a DCI format, such as DCI format 0_1 or DCI format 1_1.

A serving gNB can indicate a selected configuration to a UE by a MAC CE in a PDSCH transmission to the UE. The configuration can be applicable after a specified time period that is determined by a time required for a UE to apply a new configuration. For example, the time can be same as a time required for a UE to apply a new TCI state as indicated by a MAC CE. To ensure that abrupt changes in coverage do not result to the UE being out of coverage when the UE uses a configuration with a reduced number of receiver antennas, the UE can switch to using the maximum number of receiver antennas, such as four receiver antennas, with a periodicity that can be configured to the UE by higher layers from the serving gNB. For example, in one or more slots per number of slots, such as 40 slots or every 40 msec, the UE can have all receiver antennas activated and then deactivate some of the receiver antennas based on the configuration indicated by the serving gNB. The number of slots can be configured to the UE by higher layers or be defined in the NR specification of the system operation.

As different receiver antennas can experience different path-loss, for example due to the UE design or due to external factors such as the UE placement/orientation or due to blockage by human or other interference to the received signal, the UE can report to a serving gNB a CQI or a SINR/RSRP per receiver antenna or per subset of receiver antennas. The report can be for a reference cell, such as the PCell, or for any cell that the UE reports CQI or RSRP. For example, the report can include an RSRP for a first receiver antenna, such as the one with the largest RSRP, and a differential RSRP in quantized steps of, for example, 3 dB for the remaining receiver antennas. For example, the report can include a CQI for 4 receiver antennas, a CQI for 2 receiver antennas, or a CQI for 1 receiver antenna. This can provide additional information to a serving gNB for determining a configuration for a number of receiver antennas (and of transmitter antennas) for the UE.

For example, if the RSRP for a second antenna is at least 6 dB smaller than the RSRP for a first antenna, the gNB can indicate to the UE to deactivate the second receiver antenna. It is also possible for the UE to make such decision independently without informing the gNB if the UE determines that an RSRP for one receiver antenna is below a predetermined threshold relative to the RSRP of another receiver antenna.

Figure 12:
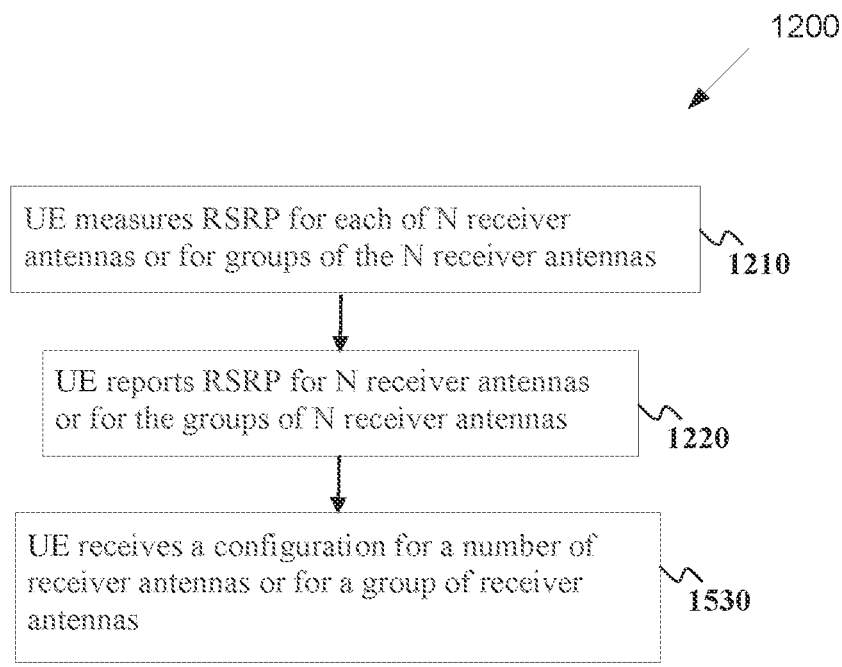
FIG. 12 illustrates a flowchart of a method for a UE reporting for determining a configuration for a number of UE receiver antennas according to embodiments of the present disclosure.

FIG. 12 illustrates a flowchart of a method 1200 for a UE reporting for determining a configuration for a number of UE receiver antennas according to embodiments of the present disclosure. An embodiment of the method 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions. Other embodiments are used without departing from the scope of the present disclosure.

A UE is equipped with N receiver antennas. The UE measures a reception quality, such as an RSRP or CQI, for each of the N receiver antennas or for groups of the N receiver antennas in step 1210. The UE reports the RSRP or CQI for the N receiver antennas, or for the groups of the N receiver antennas, to a gNB in step 1220. The UE receives, from the gNB, a configuration for a number of receiver antennas, or for a group of receiver antennas, for the UE to receive transmissions from the gNB in step 1230. In case the configuration provides a number of receiver antennas, the receiver antennas are the ones equal to the number and having the larger reported RSRP.

A configuration can also be implicitly determined by a UE based on the operating conditions. For example, when the UE switches from a first BWP to a second BWP, such as a default BWP or an initial BWP, the UE can also switch from a first configuration to a second configuration. The BWP can be relative to any active cell or only for the primary cell. For example, the UE can operate with four receiver antennas when a DL BWP is a first DL BWP, such as a large DL BWP supporting high data rates, and operate with two receiver antennas when a DL BWP is a second DL BWP, such as a small DL BWP supporting transmission of small data packets to the UE. Such a UE behavior can be enabled by a serving gNB though a respective configuration by higher layers.

Figure 13:
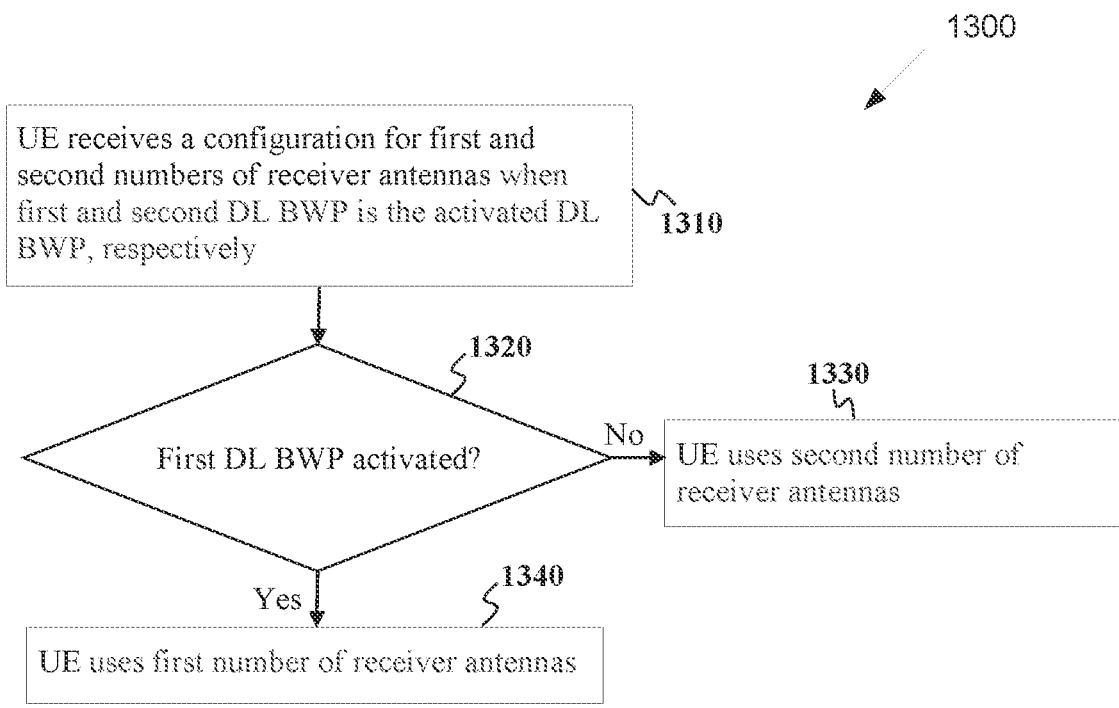
FIG. 13 illustrates a flowchart of a method for a UE determination for a number of UE receiver antennas depending on a corresponding DL BWP according to embodiments of the present disclosure.

FIG. 13 illustrates a flowchart of a method 1300 for a UE determination for a number of UE receiver antennas depending on a corresponding, DL BWP according to embodiments of the present disclosure. An embodiment of the method 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 13, a UE receives a configuration for a first number of receiver antennas when a first DL BWP is the activated DL BWP and for a second number of receiver antennas when a second DL BWP is the activated DL BWP in step 1310. The UE determines whether an activated DL BWP is the first DL BWP or the second DL BWP in step 1320. When the activated DL BWP is the first DL BWP, the UE uses the first number of receiver antennas in step 1330. When the activated DL BWP is the second DL BWP, the UE uses the second number of receiver antennas in step 1340. The UE can further select the first number and the second number to be the ones corresponding to the receiver antennas where the UE measures the larger RSRP.

A gNB can provide an adaptation of a configuration of transmissions/receptions by a UE using either higher layer signaling, such as a MAC CE or RRC, or layer 1 (physical layer) signaling. The latter is preferable when minimum latency for an adaptation of a configuration is material in achieving most gains from the adaptation. When a number of bits required to provide an adaptation for a configuration of transmissions/receptions by a UE is more than a few or when the adaptation is not frequent, a re-interpretation of a UE-specific DCI format to indicate the adaptation can be a more efficient choice than using one or more fields in a UE-common DCI format or in a UE-specific DCI format. This is because a UE-specific DCI format that can be reinterpreted to indicate an adaptation of a configuration can be transmitted by a gNB to a UE on demand instead of always reserving fields to indicate the adaptation of the configuration for the UE in a UE-common DCI format or in a UE-specific DCI format when an actual use of those fields is not frequent.

The reinterpretation of a UE-specific DCI format to indicate an adaptation of a configuration to the UE instead of scheduling a PDSCH reception or PUSCH transmission can be by an explicit field of 1 bit or by setting existing fields of the UE-specific DCI format to specific values. For example, in a DCI format 0_1, a field indicating absence of uplink shared channel (UL-SCH) transmission can be set (no UL-SCH) and a field indicating a request for an A-CSI report is not set (no A-CSI report).

For example, a field indicating a redundancy version (RV) can be set to indicate RV 3 or RV 1 and a field indicating transmission of a new transport block (NDI) can be set to indicate a new transport block. When the DCI format is interpreted to convey an adaptation of a configuration for transmission/reception parameters for a UE, the remaining bits of the DCI format (other than the bits used for the interpretation and the CRC bits) can be used to indicate the adaptation with some bits being reserved/not used in case the adaptation can be indicated with fewer bits than the remaining bits of the DCI format.

The adapted configuration can include a number of receiver antennas, a number of transmitter antennas, a number of layers, a number of activated cells or BWPs, the parameters for a C-DRX period (On Duration and Inactivity Timer), the parameters for PDCCH monitoring, other parameters related to configurations of search space sets such as a scaling of PDCCH candidates, and so on. The adaptation of the configuration can become effective either immediately or after a predetermined time from a time the UE provides HARQ-ACK information in response to the DCI format detection.

A fallback operation to recover from potential errors can be supported by the UE using a configuration for transmissions/receptions that was previously provided by higher layers or is default at predetermined or configured time periods, such as every 40 msec, or when the UE monitors UE-specific DCI formats in a common search space, and so on.

A processing time associated with scheduling PDSCH/PUSCH reception/transmission (e.g., N0/N2 symbols) can be set. N0 or N2 indicate a minimum processing time needed for a UE to receive a PDSCH or to transmit a PUSCH, respectively. The delay between a PDCCH and an associated PDSCH/PUSCH reception/transmission, i.e., K1/K2, needs to be larger than N0/N2. The default values of N0/N2 can be predefined in a system operation or can be provided to a UE by higher layer signaling. For example, a default value of N0/N2 can be 1 slot. The UE can go to light sleep for a period no larger than N0/N2 after detecting a corresponding DCI format in a PDCCH in order to save power.

To improve UE power saving gains, a serving gNB can transmit to a UE control information that indicates a dynamic update of N0/N2 in order to adapt to different power savings gain targets or different latency requirements. For example, when the control information is 1 bit, "0" can indicate doubling of N0/N2 relative to the predetermined values, such as N0=2×N0_default or N2=2×N0_default, while "1" can indicate N0=max(N0/2, N0_default) or N2, (N2/2, N2_default). N0_default and N2_default are the values of N0 and N2 that are provided to the UE by higher layers or are predetermined in the system operation.

When a UE is configured for operation with CA, activation/deactivation of SCells can be combined with adaptation on N0/N2. When N0/N2 is larger than a threshold, T^N0/T^N2, SCells without scheduled PDSCH/PUSCH reception/transmission for the UE in a PDCCH monitoring period on a scheduling cell can be deactivated. Conversely, when the UE detects a DCI format in a PDCCH that the UE receives on a scheduling cell and schedules PDSCH/PUSCH reception/transmission on an SCell, the UE activates the SCell. The UE can also activate the SCell whenever the UE is triggered or configured for CSI-RS reception or SRS transmission on the SCell.

Figure 14:
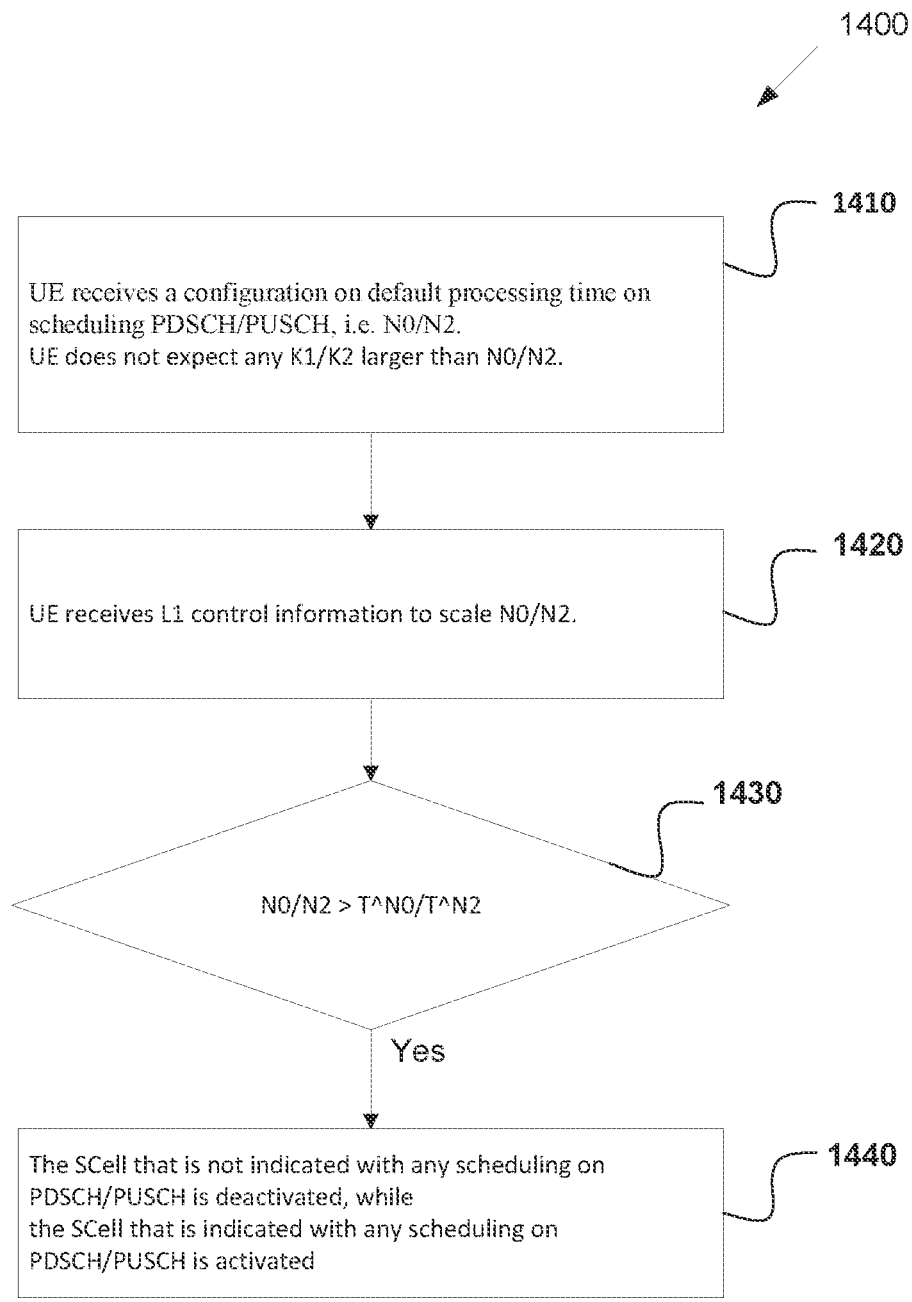
FIG. 14 illustrates a flowchart of a method for adaptation of processing time for scheduling PDSCH/PUSCH reception/transmission on an SCell combined with an activation or deactivation of the SCell according to embodiments of the present disclosure.

FIG. 14 illustrates a flowchart of a method 1400 for adaptation of processing time for scheduling PDSCH/PUSCH reception/transmission on an Well combined with an activation or deactivation of the SCell according to embodiments of the present disclosure. An embodiment of the method 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions. Other embodiments are used without departing from the scope of the present disclosure.

A default configuration for a set of slot timing values K1 associated with only the primary cell and SCS of 15 KHz can be provided to a UE by higher layers, such as a parameter dl_DataTo_UL_ACK. When a serving gNB indicates to a UE to switch from an active BWP with SCS_j to and active BWP with SCS_i, a size/cardinality of K1, denoted as |K1|, can be adapted to |K1|*(SCS_j/SCS_i) and the range for elements in the set of K1 values, [0, v_i], can be adapted to [0, v_j]*(SCS_j/SCS_i).

Slot timing values of K1 can be adapted to traffic load indicated by number of activated cells. Multiple numbers of activated cells can be predefined and can correspond to "CA levels." For example, CA level 0/CA level 1/CA level 2/CA level 3/CA level 4, denoted as, L^CA_0/L^CA_1/L^CA_2/L^CA_3/L^CA_4, can be predefined as associated with a number of 1/2/4/8/16 activated cells, respectively. When a CA level changes from L^CA_i to L^CA_j due to activation or deactivation of cells for adapting to different traffic loads, a size/cardinality of K1, denoted as |K1|, can be adapted to |K1|*(L^CA_j/L^CA_i) and the range for elements in the set of K1 values, [0, v_i], can be adapted to [0, v_j]*(L^CA_j/L^CA_i).

As illustrated in FIG. 14, a UE receives a configuration on default processing time on scheduling PDSCH/PUSCH, N0/N2, and the UE does not expect any K1/K2 larger than N0/N2 in step 1410. In step 1420, the UE receives L1 control information to scale N0/N2. In step 1430, the UE determines N0/N2>T^N0/T^N2. When N0/N2>T^N0/T^N2 in step 1430, the UE in step 1440 deactivates SCells that are not indicated for PDSCH/PUSCH scheduling and activates SCells that are indicated for PDSCH/PUSCH scheduling.

Figure 15:
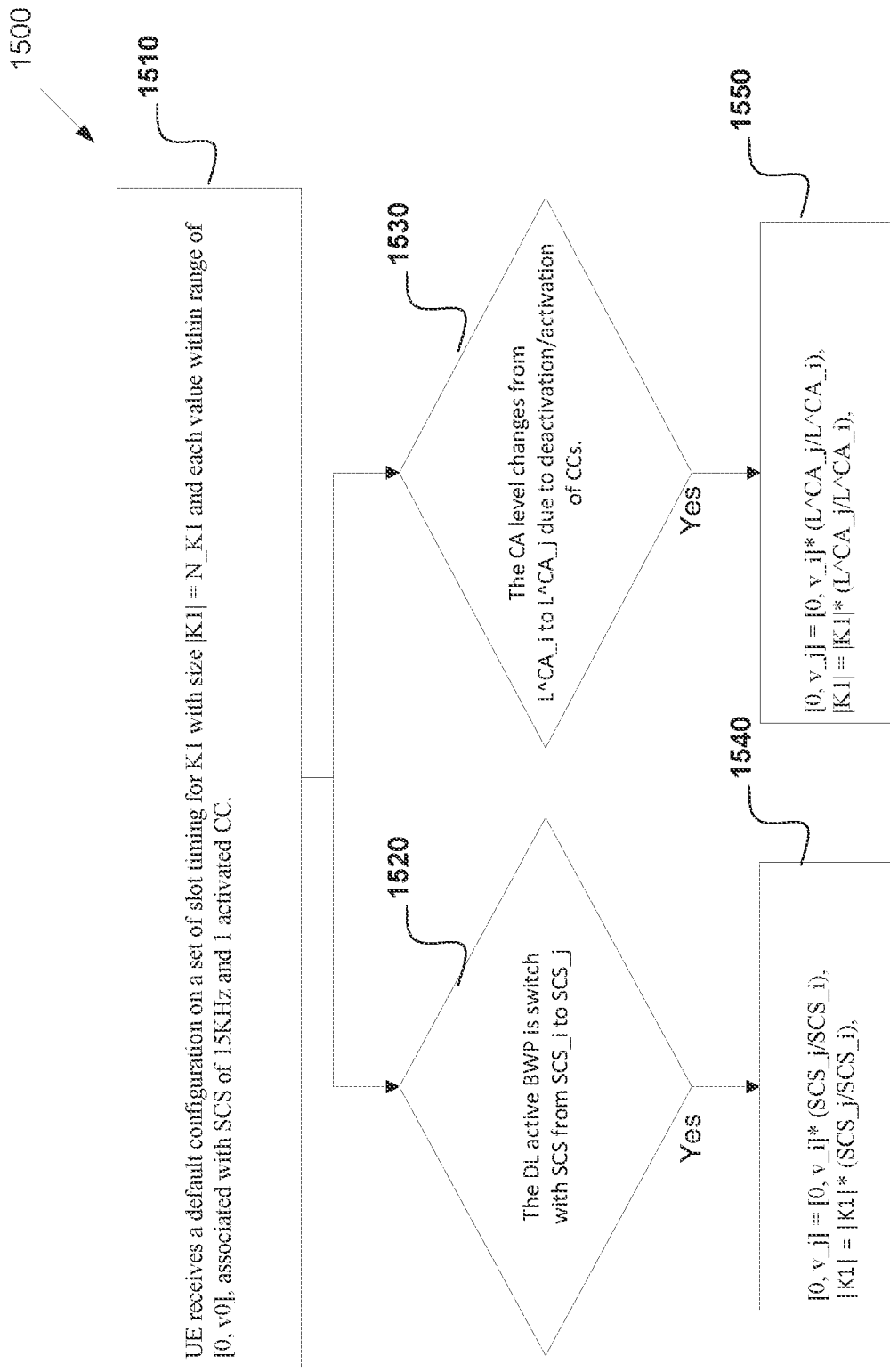
FIG. 15 illustrates a flowchart of a method for an adaption of slot timing values K1 together with BWP switching and SCell activation/deactivation according to embodiments of the present disclosure.

FIG. 15 illustrates a flowchart of a method 1500 for an adaption of slot timing values K1 together with BWP switching and SCell activation/deactivation according to embodiments of the present disclosure. An embodiment of the method 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions. Other embodiments are used without departing from the scope of the present disclosure.

When a UE is configured for operation with dual connectivity (DC), a gNB for the master cell group (MCG) and a gNB for the secondary cell group (SCG) operate independently and an adaptation for a configuration of transmission/reception parameters for a UE is typically required on both the MCG and the SCG. For example, when both the MCG and the SCG operate on a same frequency range, such as below 6 GHz, the UE needs to operate with either 2 Rx antennas or with 4 Rx antennas on both MCG and SCG and coordination between the MCG and the SCG for a number of UE receiver antennas is needed.

When PDCCH monitoring occasions are adapted on the MCG or the SCG, it is beneficial to have a similar adaptation on the SCG or the MCG, respectively, so that the UE monitors PDCCH on both the MCG and the SCG at a same time or is on sleep mode on the MCG and the SCG at a same time. For example, the MCG and the SCG can exchange over a backhaul link respective C-DRX cycles for a UE or the MCG can indicate to the SCG the C-DRX cycle configuration for the UE. Further, it is beneficial that the MCG and the SCG configure a UE to perform measurements when the UE is in C-DRX active time on both MCG and SCG. For example, the MCG and the SCG can exchange over a backhaul link CSI-RS patterns or the MCG can select and indicate to the SCG a CSI-RS pattern from a set of CSI-RS patterns indicated to the MCG by the SCG.

To reduce a likelihood that a UE becomes power limited for transmissions to both the MCG and the SCG, the MCG and the SCG can exchange over a backhaul link PUSCH, PUCCH, or SRS transmission patterns for periodic or semi-persistent PUSCH, PUCCH, or SRS transmissions. Then, when there is a large likelihood that the UE can be power limited for transmissions to both the MCG and the SCG, such as when the UE reports a small RSRP (large path-loss) for at least one CG, the SCG (or the MCG) can select a pattern for periodic or semi-persistent PUSCH, PUCCH, or SRS transmissions that does not overlap in time with a corresponding pattern on the MCG.

Conversely, when there is a small likelihood that the UE can be power limited for transmissions to both the MCG and the SCG, such as when the UE reports a large RSRP (small path-loss) for both CGs, the SCG (or the MCG) can select a pattern for periodic or semi-persistent PUSCH, PUCCH, or SRS transmissions that overlaps in time with a corresponding pattern on the MCG so that the UE can increase a time when the UE does not transmit (with the exception of dynamically triggered transmissions).

In case the UE provides assistance information associated with an adaptation of transmission/reception parameters, the UE can provide separate assistance information to the MCG and to the SCG or the UE can provide the assistance information associated with a configuration on the MCG/SCG also to the SCG/MCG. In the former case, the SCG/MCG can exchange the assistance information with the MCG/SCG through a backhaul link. When only the MCG can decide on an adapted configuration, the SCG can request an adapted configuration to the MCG through the backhaul link. Based on the request or, in general, based on an independent decision by the MCG, the MCG can inform the SCG of an adapted configuration.

In one example for an adaptation of a configuration for transmissions/receptions for a UE configured for DC operation, the MCG or the SCG can signal to the UE an adaptation of the configuration and can inform the SCG or the MCG, respectively, through backhaul signaling. To reduce a delay for a CG to communicate with the UE using the adapted configuration, some of the configurations, such as a configuration for a PDCCH monitoring periodicity in C-DRX cycles or for parameters of a C-DRX configuration, can have a nested structure where one configuration is a superset or a subset of another configuration.

For example, a PDCCH monitoring periodicity can be 0.5 msec, 1 msec, 2 msec, or 4 msec (or 1 slot, 2 slots, 4 slots, or 8 slots for 30 kHz SCS) and regardless of an adaptation a CG knows that the UE monitors PDCCH every 4 msec (or every 8 slots for 30 kHz SCS). In this manner, a CG can continue to schedule the UE using at least the common values of a parameter for each configuration until the UE informs the CG that the UE applies the adapted configuration. In case a configuration is CG-specific, such as for example a number of SCells, the adaptation process can be contained within the CG. In case a configuration is for a parameter such as a number of receiver antennas, a CG can make any assumption on the configuration the UE applies although a conservative assumption for a smaller possible number of receiver antennas is practically justifiable.

In one example for an adaptation of a configuration for transmissions/receptions for a UE configured for DC operation, the MCG or the SCG can indicate to the UE an adaptation of the configuration. To reduce a delay associated with backhaul signaling, the UE can act as a relay between the two CGs and signal an adapted configuration that the UE received from one CG to the other CG.

To facilitate the signaling, the possible configurations can be predetermined in a set of configurations, either by specification in the system operation or by higher layer signaling, and the UE can signal an element from the set of configurations. A configuration can include, for example, a number of search space sets, parameters for each search space set, a number of receiver antennas, and so on.

For example, for a set with 4 configurations, the UE can signal 2 bits to indicate one configuration from the 4 configurations. The UE can report the adapted configuration to a CG in a PUCCH transmission on a resource and slot offset indicated by the CG or in a PUSCH transmission in the CG. To minimize PUCCH resource overhead, an adaptation of a configuration can be restricted to occur at predetermined time instances such as every 10 msec or every 40 msec starting from frame zero or from a predetermined slot offset or frame offset relative to slot 0 in frame 0 that is provided to the UE by higher layers.

The UE can provide to one CG additional information related to the communication with the other CG. For example, together with a buffer status report (BSR) for a first CG, the UE can provide a BSR for a second CG to the first CG. The first CG can use the information for the BSR for the second CG to determine an adaptation of a configuration for transmissions/receptions from the UE as the BSR for the second CG can be used to determine likelihood that the UE has active communication with the second CG. Also, BSR for a UE can be exchanged between a MN and a SN through a backhaul link.

For example, together with an RSRP report for each receiver antenna for receptions on the first CG, the UE can provide to the first CG an RSRP report for each receiver antenna for receptions on the second CG. The first CG can use the information for the RSRP reports for the second CG to determine an adaptation for a number of receiver antennas.

For operation with DC, the MCG can indicate to the SCG through backhaul signaling a maximum number of monitored PDCCH candidates per slot, $M_{PDCCH,SCG}$, and a maximum number of non overlapped CCEs per slot $C_{PDCCH,SCG}$. The MCG can also indicate to the UE the maximum number of monitored PDCCH candidates per slot and the maximum number of non-overlapped CCEs per slot for the SCG and the UE can derive the corresponding maximum numbers for the MCG, $M_{PDCCH,MCG}$ and $C_{PDCCH,MCG}$ from the difference relative to a corresponding total maximum numbers per slot, $M_{PDCCH}$ and $C_{PDCCH}$, as $M_{PDCCH,MCG}=M_{PDCCH}-M_{PDCCH,SCG}$ and $C_{PDCCH,MCG}=C_{PDCCH}-C_{PDCCH,SCG}$, or $M_{PDCCH,MCG}$ and $C_{PDCCH,MCG}$ can also be signaled to the UE.

In one example, the MCG and the SCG can provide to the UE corresponding maximum numbers for the monitored PDCCH candidates per slot and non-overlapped CCEs per slot. Then, the MCG can control when the UE monitors PDCCH on the SCG and can partition a number of PDCCH candidates and non-overlapped CCEs between the MCG and the SCG.

In one example, when cells on the SCG operate on unpaired spectrum such as for example using a TDD UL/DL configuration, the MCG can allocate a maximum number of monitored PDCCH candidates and non-overlapping CCEs to the SCG and still use the maximum number of monitored PDCCH candidates and non-overlapping CCEs by configuring the search space sets so that the UE monitors PDCCH on the MCG when the slot has UL direction on cells of the SCG (this assumes that the SCG does not change an UL/DL configuration without informing the MCG). In general, at PDCCH monitoring occasions on a cell where corresponding CORESETs include UL symbols, a UE can allocate a corresponding PDCCH monitoring capability to one or more other cells.

In one example, the MCG can reserve a number of monitored PDCCH candidates per slot and a number of non-overlapping CCEs per slot for use on the MCG and allocate a remaining number of monitored PDCCH candidates per slot, relative to the maximum number of monitored PDCCH candidates per slot, and a remaining number of non-overlapping CCEs per slot, relative to the maximum number of non-overlapped CCEs per slot to the SCG.

Figure 16:
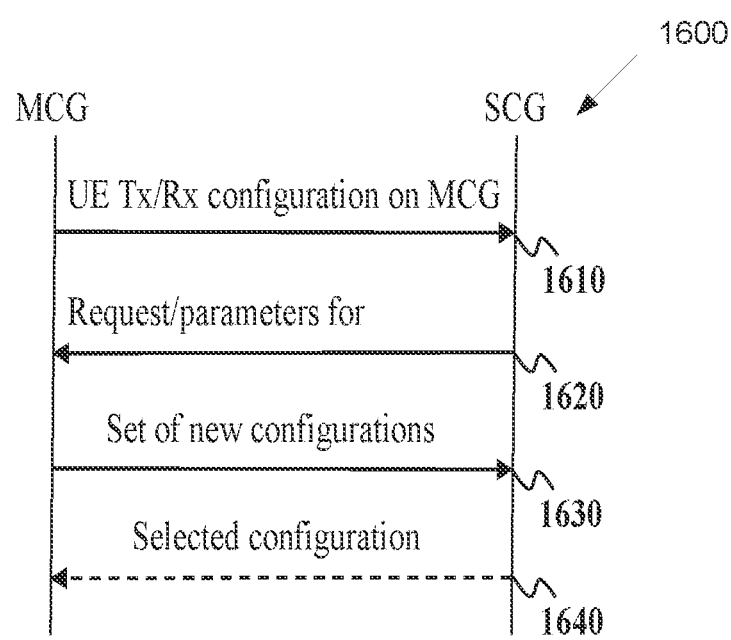
FIG. 16 illustrates a call flow for an MCG and an SCG to exchange information to determine respective configurations for communicating with a UE according to embodiments of the present disclosure.

FIG. 16 illustrates a call flow 1600 for an MCG and an SCG to exchange information to determine respective configurations for communicating with a UE according to embodiments of the present disclosure. An embodiment of the call flow 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions. Other embodiments are used without departing from the scope of the present disclosure.

An MCG configures a UE for a DC operation with an SCG and provides to the SCG through a backhaul link a configuration for transmissions/receptions by the UE on the MCG in step 1610. The configuration can include, for example, a number of antennas, a set of parameters for a C-DRX cycle, a total number of PDCCH candidates the UE is configured to monitor on the SCG and so on. The SCG provides through the backhaul link to the MCG a requested configuration or parameters for determining a configuration for transmissions/receptions by the UE on the SCG in step 1620. The provides through the backhaul link a set of one or more configurations for the SCG to use from for communicating with the UE in step 1630. When the set includes more than one configuration, the SCG can inform the MCG of the selected configuration in step 1640.

For an operation with DC, an MCG is controlled by a master node (MN) and an SCG is controlled by a secondary node (SN). When a UE is configured with DC operation, it is necessary for the MN, the SN, and the UE to have a same understanding for a number of PDCCH candidates the UE is expected to monitor per slot and for a number of non-overlapped CCEs the UE is expected to be able to perform channel estimation per slot.

A first approach is for a MN and a SN to partition $N_{cells}^{cap}$ between them where a capability of $N_{cells,MCG}^{cap}$ is used by the MN and a capability of $N_{cells,SCG}^{cap}$ is used by the SN ($N_{cells,MCG}^{cap}+N_{cells,SCG}^{cap} \leq N_{cells}^{cap}$). This embodiment requires backhaul signaling from the MN to the SN and higher layer signaling to the UE for a value of $N_{cells,SCG}^{cap}$ (then, $N_{cells,MCG}^{cap} = n_{cells,SCG}^{cap} - N_{cells,SCG}^{cap}$). The value of $N_{cells,MCG}^{cap}$ may also be separately included in the higher layer signaling, for example to enable $N_{cells,MCG}^{cap} + N_{cells,SCG}^{cap} < N_{cells}^{cap}$.

Then, for a capability of a UE to monitor PDCCH (on the active BWPs) for $M_{cells,MCG}^{cap}$ cells on the MN and $N_{cells,SCG}^{cap}$ on the SN, the UE is expected to monitor a total of $$M_{PDCCH,MCG}^{total} = \min\left\{N_{cells,MCG}^{DL,\mu} \cdot M_{PDCCH}^{max,slot,\mu}, \left\lfloor N_{cells,MCG}^{cap} \cdot M_{PDCCH}^{max,slot,\mu} \cdot N_{cells,MCG}^{DL,\mu} \Big/ \sum_{\mu=0}^{3} N_{cells,MCG}^{DL,\mu} \right\rfloor\right\}$$

PDCCH candidates for DCI formats with different sizes and/or different corresponding DM-RS scrambling sequences per slot over $N_{cells,MCG}^{DL,\mu}$ cells of the MN with SCS configuration μ.

The UE is expected to monitor a total of $$M_{PDCCH,SCG}^{total,\mu} = \min\left\{N_{cells,SCG}^{DL,\mu} \cdot M_{PDCCH}^{max,slot,\mu}, \left\lfloor N_{cells,SCG}^{cap} \cdot M_{PDCCH}^{max,slot,\mu} \cdot N_{cells,SCG}^{DL,\mu} \Big/ \sum_{\mu=0}^{3} N_{cells,SCG}^{DL,\mu} \right\rfloor\right\}$$

PDCCH candidates for DCI formats with different sizes and/or different corresponding DM-RS scrambling sequences per slot over $N_{cells,SCG}^{DL,\mu}$ cells of the SN with SCS configuration μ.

Similar, the UE is expected to monitor a total of $$C_{PDCCH,MCG}^{total,\mu} = \min\left\{N_{cells,MCG}^{DL,\mu} \cdot C_{PDCCH}^{max,slot,\mu}, \left\lfloor N_{cells,MCG}^{cap} \cdot C_{PDCCH}^{max,slot,\mu} \cdot N_{cells,MCG}^{DL,\mu} \Big/ \sum_{\mu=0}^{3} N_{cells,MCG}^{DL,\mu} \right\rfloor\right\}$$

non-overlapping CCEs for PDCCH receptions scheduling over $N_{cells,MCG}^{DL,\mu}$ cells of the MN with SCS configuration μ.

The UE is expected to monitor a total of $$C_{PDCCH,SCG}^{total,\mu} = \min\left\{N_{cells,SCG}^{DL,\mu} \cdot C_{PDCCH}^{max,slot,\mu}, \left\lfloor N_{cells,SCG}^{cap} \cdot C_{PDCCH}^{max,slot,\mu} \cdot N_{cells,SCG}^{DL,\mu} \Big/ \sum_{\mu=0}^{3} N_{cells,SCG}^{DL,\mu} \right\rfloor\right\}$$

non-overlapping CCEs for PDCCH receptions scheduling over $N_{cells,SCG}^{DL,\mu}$ cells of the SN with SCS configuration μ.

A second approach that avoids higher layer signaling to the UE is for the MN and the SN to exchange the respective values of $N_{cells,MCG}^{DL,\mu}$ and $N_{cells,SCG}^{DL,\mu}$ for a UE, or for the MN to indicate the value of $N_{cells,SCG}^{DL,\mu}$ to the SN. Then $N_{cells}^{DL,\mu} = N_{cells,MCG}^{DL,\mu} + N_{cells,SCG}^{DL,\mu}$ and the UE can treat all cells as if the cells are in a single CG for determining a number of PDCCH candidates or a number of non-overlapping CCEs that the UE is expected to monitor on a cell with SCS configuration μ.

For example, $$M_{PDCCH}^{total,\mu} = \min\left\{N_{cells}^{DL,\mu} \cdot M_{PDCCH}^{max,slot,\mu}, \left\lfloor N_{cells}^{cap} \cdot M_{PDCCH}^{max,slot,\mu} \cdot N_{cells}^{DL,\mu} \Big/ \sum_{\mu=0}^{3} N_{cells}^{DL,\mu} \right\rfloor\right\}$$

and $$C_{PDCCH}^{total,\mu} = \min\left\{N_{cells}^{DL,\mu} \cdot C_{PDCCH}^{max,slot,\mu}, \left\lfloor N_{cells}^{cap} \cdot C_{PDCCH}^{max,slot,\mu} \cdot N_{cells}^{DL,\mu} \Big/ \sum_{\mu=0}^{3} N_{cells}^{DL,\mu} \right\rfloor\right\}.$$

The SN also obtains $N_{cells}^{cap}$ either from the MN or from the UE.

An issue with the second embodiment is whether the SCS configuration μ of the active DL bandwidth part (BWP) can be used as reference for a cell when BWP switching can be triggered by a DCI format. As one cell group cannot know a BWP switching triggered by a DCI format on a cell of the other cell group, having the active DL BWP providing the SCS reference configuration for a cell can be problematic.

Alternative example includes the usage of the SCS configuration for the BWP indicated to the UE by higher layer parameter firstActiveDownlinkBWP, or the SCS configuration for the BWP with the smallest index and so on, as long as the DL BWP providing the SCS reference configuration for a cell is determined by higher layer signaling. Conversely, for operation with a single CG, the SCS reference configuration for a cell can be the one corresponding to the active DL BWP.

A third approach is to limit the total number of cells that can be configured to a UE when the UE is also configured for DC operation to no more than 4 that is assumed to be a minimum UE capability when a UE is also configured with carrier aggregation (CA) in at least one cell group. That is, a UE does not expect to process PDCCH scheduling PDSCH or PUSCH in more than 4 cells. The limit on the number of cells can be more than 4 when the UE is configured only for CA operation without being configured for DC operation.

Instead of the MN and the SN exchanging a number of respective cells with a corresponding numerology that are configured/activated to a UE for operation in the respective CGs (MCG and SCG), a functionally equivalent approach is for the MN to inform the SN of a number of PDCCH candidates and/or non-overlapping CCEs that are reserved for use on the MN or that are available for use on the SN.

The number can be either the total one across all SCS configurations or per SCS configuration. In the former case, the SN can derive a number of PDCCH candidates and/or non-overlapping CCEs available for use in the SCG by subtracting the corresponding number informed by the MN from the total number determined from the UE capability. The SN can also inform the MN of a corresponding number of PDCCH candidates and/or non-overlapping CCEs that are allocated to the UE for communication in the respective CG.

In one example, for a UE capability to monitor 4×{44, 36, 22, 20} PDCCH candidates per slot for SCS configuration μ of {0, 1, 2, 3}, the MN can inform the SN that the SN can configure the UE a maximum of {2×44, 3×36, 4×22, 4×20} PDCCH candidates for cells of the SCG. For example, for a UE capability to monitor 4×{44, 36, 22, 20} PDCCH candidates per slot for SCS configuration μ of {0, 1, 2, 3}, the MN can inform the SN that the SN can configure the UE a maximum of {100, 50, 4×22, 4×20} PDCCH candidates. For example, for a UE capability to monitor 4×{44, 36, 22, 20} PDCCH candidates per slot for SCS configuration μ of {0, 1, 2, 3}, the MN can inform the SN that the SN can configure the UE a maximum of {50%, 50%, 100%, 100%} for PDCCH candidates relative to the UE capability and the signaling can map to a predetermined set of percentages such as a 3-bit signaling mapping to {0, 15, 30, 45, 60, 75, 90, 100}%, similar for an allocation of a number of non-overlapping CCEs per slot.

For determining search space sets to monitor, at least for the second approach, a UE allocates search space sets to the PCell of the MCG and the PSCell of the SCG in an alternating manner starting from the MCG. For example, the following pseudo-code can be used for the UE to allocate monitored PDCCH candidates to USS sets for the PCell and for the PSCell having an active DL BWP with SCS configuration μ.

Denote by $V_{CCE}(S_{uss}(j, cg))$ the set of non-overlapping CCEs for search space set $S_{uss}$ (j, cg) of CG with index cg, where cg=0 for the MCG and cg=1 for the SCG, and by $C(V_{CCE}(S_{uss}(j, cg)))$ the cardinality of $V_{CCE}(S_{uss}(j, cg))$ of CG with index cg where the non-overlapping CCEs for search space set $S_{uss}$ (j, cg) are determined considering the monitored PDCCH candidates for the CSS sets and the monitored PDCCH candidates for all search space sets $S_{uss}$ (k, cg), 0≤k≤j. TABLE 1 shows some configuration.

TABLE 1

Setting parameters

Set $M_{PDCCH}^{uss} = \min(M_{PDCCH}^{max,slot,\mu}, M_{PDCCH}^{total,slot,\mu}) - M_{PDCCH}^{css}$
Set $C_{PDCCH}^{uss} = \min(C_{PDCCH}^{max,slot,\mu}, C_{PDCCH}^{total,slot,\mu}) - C_{PDCCH}^{css}$
Set j = 0
Set cg = 0
while $\Sigma_L M_{S_{uss}(j,cg)}^{(L)} \leq M_{PDCCH}^{uss}$ AND $C(V_{CCE}(S_{uss}(j, cg))) \leq C_{PDCCH}^{uss}$
    allocate $\Sigma_L M_{S_{uss}(j,cg)}^{(L)}$ monitored PDCCH candidates to USS set $S_{uss}(j, cg)$
    $M_{PDCCH}^{uss} = M_{PDCCH}^{uss} - \Sigma_L M_{S_{uss}(j,cg)}^{(L)}$;
    $C_{PDCCH}^{uss} = C_{PDCCH}^{uss} - C(V_{CCE}(S_{uss}(j, cg)))$;
    cg = (cg + 1) mod 2;
    if cg = 0
    j = j + 1 ;
    end if
end while TABLE 2 shows a UE's operation based on some of conditions.

TABLE 2

UE operation

When a UE
  has a set of activated cells on a CG, and
  is provided an UL/DL configuration for a first activated cell from the set of activated cells, and
  is configured a PDCCH monitoring occasion in a set of symbols of a slot on the first activated cell, and
  is configured a PDCCH monitoring occasion in the set of symbols of the slot on one or more activated cells, from the set of activated cells, other than the first activated cell, and determines a first number of PDCCH candidates for the PDCCH monitoring occasion, and
  at least one symbol from the set of symbols of the slot is an UL symbol on the first activated cell, and
  each symbol from the set of symbols of the slot is a DL symbol or a flexible symbol on the one or more activated cells,
the UE
  does not monitor PDCCH candidates in the set of symbols of the slot on the first activated cell, and
  allocates a second number of PDCCH candidates, from the first number of PDCCH candidates, to the one or more activated cells from the set of activated cells if the number of PDCCH candidates on the one or more activated cells is smaller than the maximum number of PDCCH candidates per cell.

As illustrated in TABLE 2, the UE behavior for PDCCH candidates also applies for non-overlapping CCEs in a similar manner. As illustrated in TABLE 2, the UE behavior can be further conditioned on all symbols of the slot on the first activated cell being UL symbols. As illustrated in TABLE 2, the UE behavior can be extended for an activated cell of the MCG (or of the SCG) in case of synchronous operation at least for same SCS configurations on all scheduling cells of the MCG and the SCG. That is, when a slot for the activated cell of the MCG (or of the SCG) includes only UL symbols, and each other activated cell of the MCG (or of the SCG) that includes at least one PDCCH monitoring occasion in the slot with each symbol for the at least one PDCCH monitoring occasion being a DL symbol or flexible symbol is allocated the maximum number of PDCCH candidates per slot that the UE can allocate a number of $$\left\lfloor N_{cells,MCG}^{cap} \cdot M_{PDCCH}^{max,slot,\mu} \cdot N_{cells,MCG}^{DL,\mu} \Big/ \sum_{\mu=0}^{3} N_{cells,MCG}^{DL,\mu} \right\rfloor - N_{cells,MCG}^{DL,\mu} \cdot M_{PDCCH}^{max,slot,\mu} PDCCH$$

candidates to cells of the SCG in the slot (or allocate a number of $$\left\lfloor N_{cells,MCG}^{cap} \cdot M_{PDCCH}^{max,slot,\mu} \cdot N_{cells,SCG}^{DL,\mu} \Big/ \sum_{\mu=0}^{3} N_{cells,SCG}^{DL,\mu} \right\rfloor - N_{cells,SCG}^{DL,\mu} \cdot M_{PDCCH}^{max,slot,\mu} PDCCH$$

candidates to cells of the MCG in the slot).

In addition to splitting a UE capability for PDCCH monitoring between an MCG and an SCG, another UE capability that needs to be split between the CGs is a maximum number of simultaneous CSI reports that the UE can obtain and provide across all cells of the MCG and the SCG. For example, for a CA operation, a UE can declare/report a capability to process a maximum number of simultaneous CSI reports (perform CSI-RS measurements) across all cells by a value $N_{cells}^{cap,CSI}$ of higher layer parameter simultaneousCSI-ReportsAllCC.

For dual connectivity operation, the UE can be provided, for example from the MN, a value $N_{cells,MCG}^{cap,CSI}$ for higher layer parameter simultaneousCSI-ReportsAllCC_MCG indicating a maximum number of simultaneous CSI reports that the UE should be able to process across all cells of the MCG and a value $N_{cells,SCG}^{cap,CSI}$ for higher layer parameter simultaneousCSI-ReportsAllCC_SCG indicating a maximum number of simultaneous CSI reports that the UE should be able to process across all cells of the SCG.

The MN can also inform the SN, for example through backhaul signaling, of the value $N_{cells,SCG}^{cap,CSI}$ of higher layer parameter simultaneousCSI-ReportsAllCC_SCG and, possibly, of the value $N_{cells,MCG}^{cap,CSI}$ of higher layer parameter simultaneousCSI-ReportsAllCC_MCG.

For example, $N_{cells,MCG}^{cap,CSI} + N_{cells,MCG}^{cap,CSI} = N_{cells}^{cap,CSI}$. It is also possible that for operation with dual connectivity, the UE reports separate capabilities for the MCG and the SCG to indicate a maximum number of simultaneous CSI reports that the UE can provide across all cells of the MCG and the SCG, respectively. This can also apply for a PDCCH monitoring capability where the UE can report a higher layer parameter pdcch-BlindDetectionCA_MCG and a higher layer parameter pdcch-BlindDetectionCA_SCG for a number of cells on the MCG and the SCG, respectively, that the UE can monitor a maximum number of PDCCH candidates per slot and per cell. For example, the UE can report a value $N_{cells,MCG,UE}^{cap,CSI}$ for a higher layer parameter simultaneousCSI-ReportsAllCCMCG_UE and a value $N_{cells,SCG,UE}^{cap,CSI}$ for a higher layer parameter simultaneousCSI-ReportsAllCCSCG_UE. For example, $N_{cells,MCG,UE}^{cap,CSI} + N_{cells,MCG,UE}^{cap,CSI} \geq N_{cells}^{cap,CSI}$. For example, the UE can report a value $N_{cells,MCG}^{cap}$ for higher layer parameter pdcch-BlindDetectionCA_MCG and a value $N_{cells,SCG}^{cap}$ for higher layer parameter pdcch-BlindDetectionCA_SCG.

A gNB can include a search space determination in a configuration of a search space set to a UE. For example, a search space determination can be according to Equation 1 or according to a nested search space. A first search space set can be configured a first search space, such as in Equation 1, for a determination of CCEs for corresponding PDCCH candidates and a second search space can be configured a second search space, such as a nested search space, for a determination of CCEs for corresponding PDCCH candidates.

A configuration of a search space determination can also be conditioned on a UE supporting multiple services, such as a multicast-broadband broadband (MBB) service and an ultra-reliability low latency communication (URLLC) service. Then, in a UE-specific search space set (USS set) where a UE is configured to monitor PDCCH with DCI format(s) associated with MBB service and PDCCH with DCI format(s) associated with URLLC service, or configured to monitor PDCCH with DCI format(s) associated only with URLLC service, the UE can use a nested search space to determine CCEs for the PDCCH candidates while in a USS set where the UE is configured to monitor PDCCH with DCI format(s) associated only with MBB service, the UE can use a search space according to Equation 1 to determine CCEs for the PDCCH candidates.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A method, comprising:
   receiving:
     radio resource control (RRC) information for a set of values of a parameter associated with a discontinuous reception (DRX) operation for physical downlink control channels (PDCCHs), and
     a PDCCH according to a common search space (CSS), wherein the PDCCH provides a downlink control information (DCI) format;
   decoding the DCI format;
   determining a first value of the parameter to be one of:
     a value, from the set of values for the parameter, indicated by a first field in the DCI format when the DCI format is correctly decoded, and
     a predetermined value when the DCI format is not correctly decoded; and
   receiving PDCCHs according to the first value of the parameter.

2. The method of claim 1, wherein the predetermined value is a largest value from the set of values.

3. The method of claim 1, further comprising:
   receiving RRC information indicating the predetermined value.

4. The method of claim 1, further comprising:
   receiving information for a first group of cells and for a second group of cells, wherein the first field is associated with DRX operation on the first group of cells.

5. The method of claim 4, further comprising:
   determining a second value of the parameter to be one of:
     a value, from the set of values for the parameter, indicated by a second field in the DCI format when the DCI format is correctly received, and
     the predetermined value when the DCI format is not correctly decoded; and
   receiving PDCCHs on cells from the second group of according to the second value of the parameter.

6. The method of claim 1, wherein the parameter is a drx-onDurationTimer that is associated with a time for PDCCH receptions during a DRX cycle.

7. The method of claim 1, wherein the parameter is a drx-InactivityTimer that is associated with a time for PDCCH receptions after a last PDCCH reception indicating a transmission or reception of a new transport block.

8. The method of claim 1, wherein the set of values includes pairs of values for:
   a drx-onDurationTimer parameter that is associated with a time for PDCCH receptions during a DRX cycle, and
   a drx-InactivityTimer parameter that is associated with a time for PDCCH receptions after a last PDCCH reception indicating a transmission or reception of a new transport block.

9. A user equipment (UE), comprising:
   a transceiver configured to receive:
     radio resource control (RRC) information for a set of values of a parameter associated with a discontinuous reception (DRX) operation for physical downlink control channels (PDCCHs), and
     a PDCCH according to a common search space (CSS), wherein the PDCCH provides a downlink control information (DCI) format; and
   a processor, operably coupled to the transceiver, the processor configured to:
     decode the DCI format, and
     determine a first value of the parameter to be one of:
       a value, from the set of values for the parameter, indicated by a first field in the DCI format when the DCI format is correctly decoded, and
       a predetermined value when the DCI format is not correctly decoded, wherein the transceiver is further configured to receive PDCCHs according to the first value of the parameter.

10. The UE of claim 9, wherein the predetermined value is a largest value from the set of values.

11. The UE of claim 9, wherein the transceiver is further configured to receive RRC information indicating the predetermined value.

12. The UE of claim 9, wherein:
the transceiver is further configured to receive information for a first group of cells and for a second group of cells, and
the first field is associated with DRX operation on the first group of cells.

13. The UE of claim 12, wherein the processor is further configured to determine a second value of the parameter to be one of:
a value, from the set of values for the parameter, indicated by a second field in the DCI format when the DCI format is correctly decoded, and
the predetermined value when the DCI format is not correctly decoded; and
wherein the transceiver is further configured to receive PDCCHs on cells from the second group of according to the second value of the parameter.

14. The UE of claim 9, wherein the parameter is a drx-onDurationTimer that is associated with a time for PDCCH receptions during a DRX cycle.

15. The UE of claim 9, wherein the parameter is a drx-InactivityTimer that is associated with a time for PDCCH receptions after a last PDCCH reception indicating a transmission or reception of a new transport block.

16. The UE of claim 9, wherein the set of values includes pairs of values for:
a drx-onDurationTimer parameter that is associated with a time for PDCCH receptions during a DRX cycle, and
a drx-InactivityTimer parameter that is associated with a time for PDCCH receptions after a last PDCCH reception indicating a transmission or reception of a new transport block.

17. A base station of a master node (MN), the base station comprising:
a transceiver configured to transmit:
radio resource control (RRC) information for a set of values of a parameter associated with a discontinuous reception (DRX) operation for physical downlink control channels (PDCCHs), and
a PDCCH according to a common search space (CSS), wherein the PDCCH provides a downlink control information (DCI) format; and
a processor, operably coupled to the transceiver, the processor configured to determine a first value of the parameter to be a value, from the set of values for the parameter, indicated by a field in the DCI format, wherein the transceiver is further configured to transmit signaling over a backhaul link to a secondary node (SN) for the first value of the parameter.

18. The base station of claim 17, wherein the parameter is a drx-onDurationTimer that is associated with a time for PDCCH receptions during a DRX cycle by a user equipment (UE).

19. The base station of claim 17, wherein the parameter is a drx-InactivityTimer that is associated with a time for PDCCH receptions by a user equipment (UE), after a last PDCCH reception indicating a transmission or reception of a new transport block.

20. The base station of claim 17, wherein the transceiver is further configured to receive from a user equipment (UE) a buffer status report (BSR) associated with transmissions by the UE to the SN.

* * * * *